United States Patent
Abrams

(10) Patent No.: US 9,012,005 B2
(45) Date of Patent: Apr. 21, 2015

(54) FLOCKED STRETCHABLE DESIGN OR TRANSFER INCLUDING THERMOPLASTIC FILM AND METHOD FOR MAKING THE SAME

(75) Inventor: Louis Brown Abrams, Fort Collins, CO (US)

(73) Assignee: High Voltage Graphics, Inc., Fort Collins, CO (US)

( * ) Notice: Subject to any disclaimer, the term of this patent is extended or adjusted under 35 U.S.C. 154(b) by 834 days.

(21) Appl. No.: 12/706,622

(22) Filed: Feb. 16, 2010

(65) Prior Publication Data

US 2010/0209654 A1 Aug. 19, 2010

Related U.S. Application Data

(60) Provisional application No. 61/152,923, filed on Feb. 16, 2009.

(51) Int. Cl.
*B32B 5/00* (2006.01)
*B05D 1/16* (2006.01)
*B32B 7/12* (2006.01)
*B29C 45/14* (2006.01)

(52) U.S. Cl.
CPC .............. *B32B 7/12* (2013.01); *B29C 45/14811* (2013.01); *B29K 2713/00* (2013.01); *B29K 2715/006* (2013.01)

(58) Field of Classification Search
USPC ....................................... 428/90, 95
See application file for complete search history.

(56) References Cited

U.S. PATENT DOCUMENTS

| | | |
|---|---|---|
| 1,580,717 A | 4/1926 | Flick |
| 1,975,542 A | 10/1934 | Forsdale |
| 2,278,227 A | 3/1942 | Thackeray et al. |
| 2,592,602 A | 4/1952 | Saks |
| 2,636,837 A | 4/1953 | Summers |
| 2,981,588 A | 4/1961 | Haber |
| 2,999,763 A | 9/1961 | Sommer |
| 3,099,514 A | 7/1963 | Haber |
| 3,215,584 A | 11/1965 | McConnell et al. |
| 3,314,845 A | 4/1967 | Perri |
| 3,377,232 A | 4/1968 | Meacock et al. |
| 3,432,446 A | 3/1969 | Coppeta |

(Continued)

FOREIGN PATENT DOCUMENTS

| | | |
|---|---|---|
| EP | 0122656 | 10/1984 |
| EP | 0210304 | 2/1987 |

(Continued)

OTHER PUBLICATIONS

"3914 Data Sheet." Bemis, Aug. 20, 2009, 2 pages.

(Continued)

*Primary Examiner* — Cheryl Juska
(74) *Attorney, Agent, or Firm* — Sheridan Ross P.C.

(57) ABSTRACT

The invention is directed generally to stretchable flocked articles and/or assemblies, more specifically stretchable flocked articles and/or assemblies having at least one elastomeric adhesive and a method for making the same. One aspect of the invention is an elastomeric textile product comprising a textile design and a self-supporting, elastomeric adhesive layer. In one preferred embodiment, the self-supporting, elastomeric adhesive layer comprises an elastomeric film position between opposing first and second adhesive films.

42 Claims, 18 Drawing Sheets

(56) References Cited

U.S. PATENT DOCUMENTS

| | | |
|---|---|---|
| 3,459,579 A | 8/1969 | Newman |
| 3,496,054 A | 2/1970 | Baigas, Jr. |
| 3,529,986 A | 9/1970 | Kappas et al. |
| 3,565,742 A | 2/1971 | Stephens et al. |
| 3,591,401 A | 7/1971 | Snyder et al. |
| 3,674,611 A | 7/1972 | Petry et al. |
| 3,772,132 A | 11/1973 | Dulin, Jr. |
| 3,793,050 A | 2/1974 | Mumpower, Jr. |
| 3,837,946 A | 9/1974 | Gribbin |
| 3,887,737 A | 6/1975 | Baxter et al. |
| 3,903,331 A | 9/1975 | Klein |
| 3,917,883 A | 11/1975 | Jepson |
| 3,956,552 A | 5/1976 | Geary |
| 3,961,116 A | 6/1976 | Klein |
| 3,979,538 A | 9/1976 | Gilman et al. |
| 4,018,956 A | 4/1977 | Casey |
| 4,031,281 A | 6/1977 | Keeling |
| 4,034,134 A | 7/1977 | Gregorian et al. |
| 4,035,532 A | 7/1977 | Gregorian et al. |
| 4,062,992 A | 12/1977 | Power et al. |
| 4,142,929 A | 3/1979 | Otomine et al. |
| 4,201,810 A | 5/1980 | Higashiguchi |
| 4,218,501 A | 8/1980 | Kameya et al. |
| 4,273,817 A | 6/1981 | Matsuo et al. |
| 4,282,278 A | 8/1981 | Higashiguchi |
| 4,292,100 A | 9/1981 | Higashiguchi |
| 4,294,577 A | 10/1981 | Bernard |
| 4,314,813 A | 2/1982 | Masaki |
| 4,319,942 A | 3/1982 | Brenner |
| 4,340,632 A | 7/1982 | Wells et al. |
| 4,362,773 A | 12/1982 | Shikinami |
| 4,385,588 A | 5/1983 | Bennetot |
| 4,390,387 A | 6/1983 | Mahn |
| 4,396,662 A | 8/1983 | Higashiguchi |
| 4,413,019 A | 11/1983 | Brenner |
| 4,418,106 A | 11/1983 | Landler et al. |
| 4,430,372 A | 2/1984 | Knoke et al. |
| 4,438,533 A | 3/1984 | Hefele |
| 4,465,723 A | 8/1984 | Knoke et al. |
| 4,574,018 A | 3/1986 | Masuda et al. |
| 4,588,629 A | 5/1986 | Taylor |
| 4,652,478 A | 3/1987 | Maii |
| 4,668,323 A | 5/1987 | Lenards et al. |
| 4,681,791 A | 7/1987 | Shibahashi et al. |
| 4,687,527 A | 8/1987 | Higashiguchi |
| 4,741,791 A | 5/1988 | Howard et al. |
| 4,810,549 A | 3/1989 | Abrams et al. |
| 4,895,748 A | 1/1990 | Squires |
| 4,961,896 A | 10/1990 | Constantino |
| 4,980,216 A | 12/1990 | Römpp |
| 5,008,130 A | 4/1991 | Lenards |
| 5,047,103 A | 9/1991 | Abrams et al. |
| 5,059,452 A | 10/1991 | Squires |
| 5,126,182 A | 6/1992 | Lumb et al. |
| 5,207,851 A | 5/1993 | Abrams |
| 5,346,746 A | 9/1994 | Abrams |
| 5,529,650 A | 6/1996 | Bowers et al. |
| 5,534,099 A | 7/1996 | Yamamoto |
| 5,543,195 A | 8/1996 | Squires et al. |
| 5,597,637 A * | 1/1997 | Abrams et al. .................. 428/90 |
| 5,685,223 A | 11/1997 | Vermuelen et al. |
| 5,756,180 A | 5/1998 | Squires et al. |
| 5,766,397 A | 6/1998 | Jones |
| 5,804,007 A | 9/1998 | Asano |
| 5,858,156 A | 1/1999 | Abrams et al. |
| 5,863,633 A | 1/1999 | Squires et al. |
| 5,981,021 A | 11/1999 | McCulloch |
| 6,010,764 A | 1/2000 | Abrams |
| 6,083,332 A | 7/2000 | Abrams |
| 6,110,560 A | 8/2000 | Abrams |
| 6,224,707 B1 | 5/2001 | Lion |
| 6,247,215 B1 | 6/2001 | Van Alboom et al. |
| 6,350,504 B1 | 2/2002 | Alboom et al. |
| 6,436,506 B1 | 8/2002 | Pinter et al. |
| 6,676,796 B2 | 1/2004 | Pinter et al. |
| 6,770,581 B1 | 8/2004 | DeMott et al. |
| 6,929,771 B1 | 8/2005 | Abrams |
| 6,977,023 B2 | 12/2005 | Abrams |
| 7,191,720 B2 | 3/2007 | Thomas |
| 7,338,697 B2 | 3/2008 | Abrams |
| 7,344,769 B1 | 3/2008 | Abrams |
| 7,351,368 B2 | 4/2008 | Abrams |
| 7,364,782 B2 | 4/2008 | Abrams |
| 7,378,043 B2 | 5/2008 | Hassan et al. |
| 7,381,284 B2 | 6/2008 | Abrams |
| 7,390,552 B2 | 6/2008 | Abrams |
| 7,393,576 B2 | 7/2008 | Abrams |
| 7,402,222 B2 | 7/2008 | Abrams |
| 7,413,581 B2 | 8/2008 | Abrams |
| 7,465,485 B2 | 12/2008 | Abrams |
| 7,632,371 B2 | 12/2009 | Abrams |
| 7,749,589 B2 | 7/2010 | Abrams |
| 7,799,164 B2 | 9/2010 | Abrams |
| 8,007,889 B2 | 8/2011 | Abrams |
| 8,168,262 B2 | 5/2012 | Abrams |
| 8,206,800 B2 | 6/2012 | Abrams |
| 8,354,050 B2 | 1/2013 | Abrams |
| 2001/0008039 A1 | 7/2001 | Alboom et al. |
| 2002/0098329 A1 | 7/2002 | Abrams |
| 2003/0129353 A1 | 7/2003 | Abrams |
| 2004/0033334 A1 | 2/2004 | Merovitz |
| 2004/0050482 A1 | 3/2004 | Abrams |
| 2004/0055692 A1* | 3/2004 | Abrams .................. 156/72 |
| 2004/0170799 A1 | 9/2004 | Carr et al. |
| 2005/0081985 A1 | 4/2005 | Abrams |
| 2005/0136211 A1 | 6/2005 | McGovern et al. |
| 2005/0260378 A1 | 11/2005 | Bernabeu |
| 2005/0268407 A1 | 12/2005 | Abrams |
| 2006/0026778 A1 | 2/2006 | Lion |
| 2006/0029767 A1 | 2/2006 | Lion |
| 2006/0257618 A1 | 11/2006 | Pascual Bernabeu |
| 2007/0022548 A1 | 2/2007 | Abrams |
| 2007/0110949 A1 | 5/2007 | Abrams |
| 2007/0148397 A1 | 6/2007 | Abrams |
| 2007/0289688 A1 | 12/2007 | Abrams |
| 2008/0003394 A1 | 1/2008 | Eke |
| 2008/0003399 A1 | 1/2008 | Abrams |
| 2008/0006968 A1 | 1/2008 | Abrams |
| 2008/0050548 A1 | 2/2008 | Abrams |
| 2008/0095973 A1 | 4/2008 | Abrams |
| 2008/0102239 A1 | 5/2008 | Abrams |
| 2008/0111047 A1 | 5/2008 | Abrams |
| 2008/0145585 A1 | 6/2008 | Abrams |
| 2009/0075075 A1 | 3/2009 | Abrams |
| 2009/0239025 A1 | 9/2009 | Abrams |
| 2010/0068447 A1 | 3/2010 | Abrams |
| 2010/0092719 A1 | 4/2010 | Abrams |
| 2010/0092720 A1 | 4/2010 | Abrams |
| 2010/0143669 A1 | 6/2010 | Abrams |
| 2010/0159185 A1 | 6/2010 | Cremin et al. |
| 2010/0173119 A1 | 7/2010 | Vitarana et al. |
| 2010/0233410 A1 | 9/2010 | Abrams |
| 2010/0316832 A1 | 12/2010 | Abrams |
| 2011/0052859 A1 | 3/2011 | Abrams |
| 2011/0223373 A1 | 9/2011 | Abrams |
| 2012/0028003 A1 | 2/2012 | Abrams |

FOREIGN PATENT DOCUMENTS

| | | |
|---|---|---|
| EP | 0351079 | 1/1990 |
| EP | 0913271 | 10/1998 |
| EP | 0989227 | 3/2000 |
| EP | 1072712 | 1/2001 |
| EP | 1598463 | 11/2005 |
| FR | 2442721 | 8/1980 |
| FR | 2543984 | 10/1984 |
| FR | 2659094 | 9/1991 |
| FR | 2846202 | 4/2004 |
| FR | 2881149 | 7/2006 |
| GB | 1171296 | 11/1969 |
| GB | 1466271 | 3/1977 |
| GB | 2101932 | 1/1983 |
| GB | 2126951 | 4/1984 |
| JP | 55079143 | 6/1980 |

(56) References Cited

FOREIGN PATENT DOCUMENTS

| | | |
|---|---|---|
| JP | 55147171 | 11/1980 |
| JP | 56108565 | 8/1981 |
| JP | 56141877 | 11/1981 |
| JP | 61146368 | 7/1986 |
| JP | 62033576 | 2/1987 |
| JP | 64068582 | 3/1989 |
| JP | 01-192538 | 8/1989 |
| JP | 01-310947 | 12/1989 |
| JP | 02-048076 | 2/1990 |
| JP | 04-169297 | 6/1992 |
| JP | 05-201196 | 8/1993 |
| JP | 08-267625 | 10/1996 |
| JP | 11-256484 | 9/1999 |
| JP | 3076851 | 8/2000 |
| JP | 2000-263673 | 9/2000 |
| JP | 2001-270019 | 10/2001 |
| JP | 2001270019 A * | 10/2001 |
| KR | 2003063833 | 7/2003 |
| WO | WO 90/09289 | 8/1990 |
| WO | WO 92/04502 | 3/1992 |
| WO | WO 94/19530 | 9/1994 |
| WO | WO 97/34507 | 9/1997 |

OTHER PUBLICATIONS

"Adhesives for Decorative Apparel for High Quality Embroidered Emblems, Patches, and Sports Lettering," Bemis, Feb. 2002, 2 pages.
Advertisement,"Clarense" available at www.bemisworldwide.com on Aug. 28, 2006, 2 pages.
"EB3106 Apparel Product Data Sheet." Bemis, May 10, 2008, 1 page.
"EB3302 Apparel Product Data Sheet." Bemis, Feb. 23, 2010, 1 page.
"EB3304 Data Sheet." Bemis, Dec. 11, 2007, 1 page.
"Selector Guide: Thermoplastic Adhesives, Speciality Films & Seam Tape," Bemis, Jan. 2009, 8 pages.
"Sewfree® Adhesive Film & Tape," Bemis, Jul. 2006, 4 pages.
"Sewfree® Adhesive Film & Tape," Bemis, Jul. 2008, 6 pages.
"Sewfree® designed especially for garments," Bemis, Aug. 2008, 6 pages.

* cited by examiner

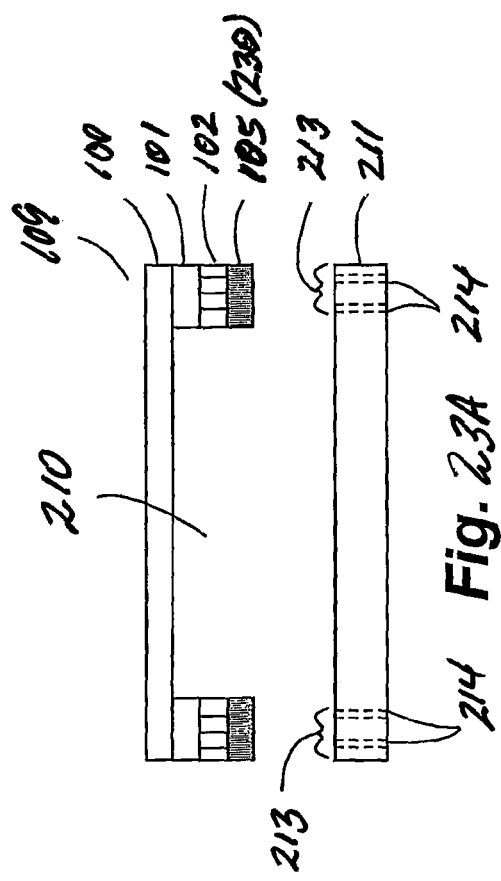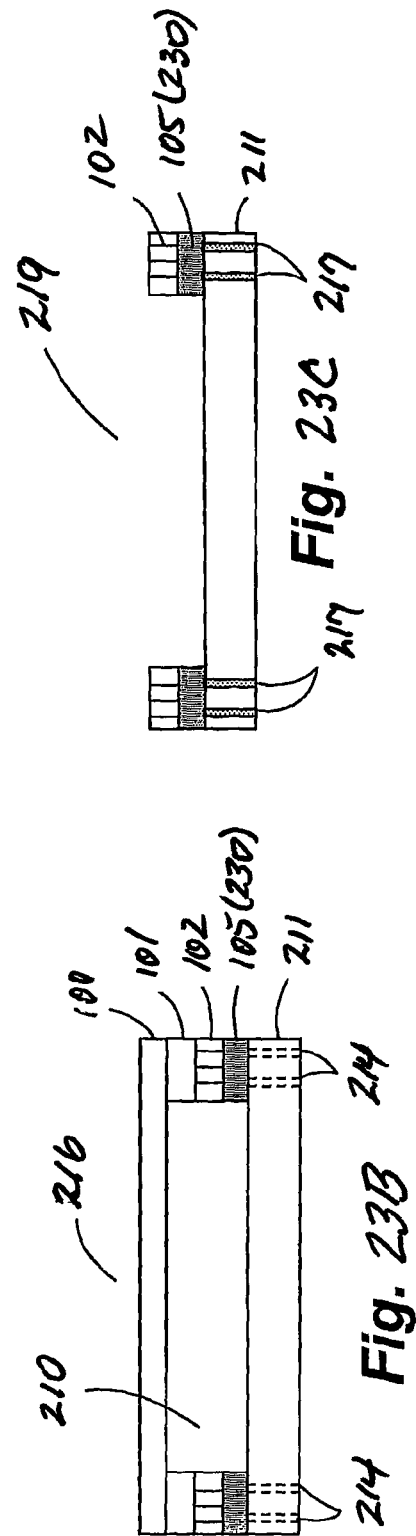

FLOCKED STRETCHABLE DESIGN OR TRANSFER INCLUDING THERMOPLASTIC FILM AND METHOD FOR MAKING THE SAME

CROSS REFERENCE TO RELATED APPLICATIONS

The present application claims the benefit of U.S. Provisional Application No. 61/152,923 filed on Feb. 16, 2009, the entire contents of which is incorporated herein by this reference in its entirety.

FIELD OF INVENTION

This invention is directed generally to stretchable flocked articles and/or assemblies, more specifically stretchable flocked articles and/or assemblies having at least one elastomeric adhesive and a method for making the same.

BACKGROUND OF THE INVENTION

Today's fashions are often fabricated with stretchable and/or elastic materials. The stretchable and/or elastic materials may comprise elastic fibers, stretchable knits and/or weaves.

It is often desirable to decorate apparel having stretchable and/or elastic properties with a textile design, such as a flocked and/or woven design. Stretchable textile designs have had limited application since the adhesive layer binding the textile to the stretchable material tends to split and/or crack when stressed, such as when stretching and/or bending the material and/or textile design. One region the splits and cracks form within is the adhesive layer binding the design to the stretchable material. Not only do the splits and cracks detract from the artist quality of design, the splits and cracks degrade form the functional quality of the design. The splits and cracks may contribute to a detachment of the textile design from the adhesive layer and/or the stretchable material. Furthermore, the stressing of the adhesive layer may cause the adhesive layer to fail to return to its original shape and/or size after the stress causing force is removed. The failure of the adhesive layer to return to its original shape and/or size may not only distort the textile design, it may also distort the material the textile design is attached to. The lack of recovery and/or cranks and splits may cause the textile design to separate and/or detach from the material the textile design is adhered to.

SUMMARY OF THE INVENTION

These and other needs are addressed by the various embodiments and configurations of the present invention. The present invention is directed generally to elastomeric appliqués and methods and/or systems for making the same.

One aspect of the present invention is an elastomeric textile product comprising a textile design and a self-supporting, elastomeric adhesive layer. The textile design comprises one or both of a plurality of flock fibers and a woven textile material. The self-supporting, elastomeric adhesive layer comprises an elastomeric film position between opposing first and second substantially continuously distributed adhesive films. The first and second adhesive films are substantially continuously distributed over an areal extent of the elastomeric film. Furthermore, the first adhesive film is substantially continuously distributed over an areal extent of an interface between the first adhesive film and the flock fibers. The first and second adhesive films are substantially free of holes and/or voids over the areal extent of the first and second adhesive films. The first and second adhesives have viscosities to form substantially continuous layers. Moreover, the first and second adhesives have viscosities, when applied to the elastomeric film, to form substantially continuous layers on the elastomeric film.

The flock fibers have opposing first and second fiber ends. The first fiber ends are in contact with the first adhesive film. Preferably, the first fiber ends are embedded in the first adhesive film. In one embodiment, the textile product may have at least one carrier sheet positioned adjacent to at least one of the second fiber ends or second adhesive film.

In one configuration, the at least one carrier sheet is reversibly adhered to the second adhesive film. In another configuration, a release adhesive is positioned between the at least one carrier sheet and the plurality of flock fibers. The second fiber ends may be in contact with the release adhesive.

In another configuration, the woven textile design is adhered to the first adhesive film. Preferably, the second adhesive film is reversibly adhered to a carrier sheet.

Another aspect of the present invention is a textile article, comprising: a substrate; one or both of a plurality of flock fibers and a woven textile design; and a self-supporting, elastomeric adhesive layer having an elastomeric film positioned between opposing first and second adhesive films, wherein the self-supporting, elastomeric adhesive layer is positioned between the substrate and one or both of the plurality of flock fibers and the woven textile design. The substrate may comprise one or both of a stretchable and/or elastic material. Preferably, the substrate comprises a stretchable and/or elastic item of apparel.

Another embodiment of the present invention is a process for embedding the first ends of the plurality of flock fibers into the first adhesive film of the self-supporting, elastomeric adhesive layer. Preferably, the self-supporting, elastomeric adhesive layer comprises a continuous self-supporting, elastomeric adhesive layer. More preferably, the flock fibers are substantially perpendicular to the continuous self-supporting, elastomeric adhesive layer.

In one configuration, the embedding of the first fiber ends into the first adhesive film comprises an electrostatic flock deposition process. Preferably, the continuous, self-supporting, elastomeric adhesive layer further comprises a carrier sheet positioned on the second adhesive film. More preferably, the second adhesive film is positioned between the elastomeric film and the carrier sheet.

In another configuration, the embedding of the first fiber ends into the first adhesive film may comprise contacting a flock assembly with the first adhesive film. The flock assembly further comprises a plurality of flock fibers adhered a carrier sheet by a release adhesive. Opposing the first fiber ends are second fiber ends, the second fiber ends are adhered the carrier sheet by the release adhesive.

The embedding process may further comprise applying at least one of heat and pressure to the one or both of the plurality of flock fibers and the self-supporting, elastomeric adhesive layer. Optionally, the embedding process may further comprise applying at least one of heat and pressure to the one or both of the flock assembly and the self-supporting, elastomeric adhesive layer.

Yet another embodiment of the present invention is a process for adhering the woven textile design to the first adhesive film of the self-supporting, elastomeric adhesive layer. Preferably, the self-supporting, elastomeric adhesive layer further comprises a continuous, self-supporting elastomeric adhesive layer having a carrier sheet positioned on the second adhesive film. More preferably, the second adhesive film is positioned between the elastomeric film and the carrier sheet. One or both of heat and pressure may be applied to one or both of the woven textile design and self-supporting, elastomeric adhesive layer in the adhering of the woven textile design to the first adhesive film.

Still yet another aspect of the present invention is a process comprising positioning the elastomeric textile product on a substrate. In one embodiment, the flock fibers of the elastomeric textile product are contacted and adhered to the first adhesive film of the self-supporting, elastomeric adhesive layer and the second adhesive film is contacted and adhered to the substrate. The second adhesive film permanently adheres the flock fibers to the substrate.

In another embodiment, the woven textile of the elastomeric textile product is contacted and adhered to the first adhesive film of the self-supporting, elastomeric adhesive layer and the second adhesive film is contacted and adhered to the substrate. The second adhesive film permanently adheres the woven textile to the substrate.

In one embodiment, after contacting the elastomeric textile product with the substrate, the process further comprises applying one or both of heat and pressure to at least one of the substrate and elastomeric textile product.

The first and second adhesive films may comprise thermoplastic adhesives. Preferably, one or both of the first and second adhesive films comprise thermoplastic polyurethanes.

The elastomeric film may be one or both of a rubber and an elastomer. In a preferred embodiment, the elastomeric film comprises polyurethane. In a more preferred embodiment, the elastic film comprises an elastomeric polyurethane.

The self-supporting, elastomeric adhesive layer may have a softening temperature from about 70° to about 85° Celsius. Preferably, the self-supporting, elastomeric adhesive layer has a recovery value, after being stretched, of at least about 95%. More preferably, the self-supporting, elastomeric adhesive layer has a melt flow index from about 40 dg/min to about 50 dg/min.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

BRIEF DESCRIPTION OF THE DRAWINGS

FIGS. 23A-23C are cross-sectional view of textile articles made according to depict textile designs according to the process depicted in FIG. 19;

DETAILED DESCRIPTION OF THE INVENTION

Figure 1:
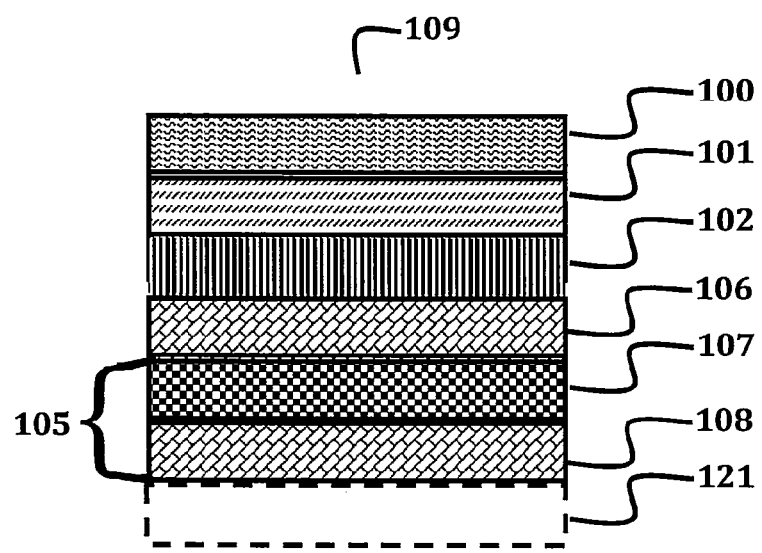
FIG. 1 is a cross-sectional view of a flocked product according to an embodiment of the present invention.

FIG. 1 depicts a flocked product 109 according to an embodiment of the present invention. The flock product 109 comprises a release adhesive 101 positioned between a first carrier sheet 100 and a plurality of flock fibers 102. The plurality of flock fibers 102 are adhered to a self-supporting, elastomeric adhesive layer 105. Preferably, the self-supporting, elastomeric adhesive layer 105 comprises an elastomeric film 107 positioned between opposing first 106 and second 108 adhesive films. The first 106 and second 108 adhesive films are substantially continuously distributed over an areal extent of the elastomeric film 107. Furthermore, the first adhesive film 106 is substantially continuously distributed over an areal extent of an interface between the first adhesive film 106 and the flock fibers 102. Moreover, the first 106 and second 108 adhesive films are substantially continuously distributed over their respective areal extents. The first 106 and second 108 adhesive films are substantially free of holes and/or voids over the areal extent of the first 106 and second 108 adhesive films. The first 106 and second 108 adhesives have viscosities to form substantially continuous layers. Moreover, the first and second adhesives have viscosities, when applied to the elastomeric film 107, to form substantially continuous layers on the elastomeric film 107.

Figure 28:
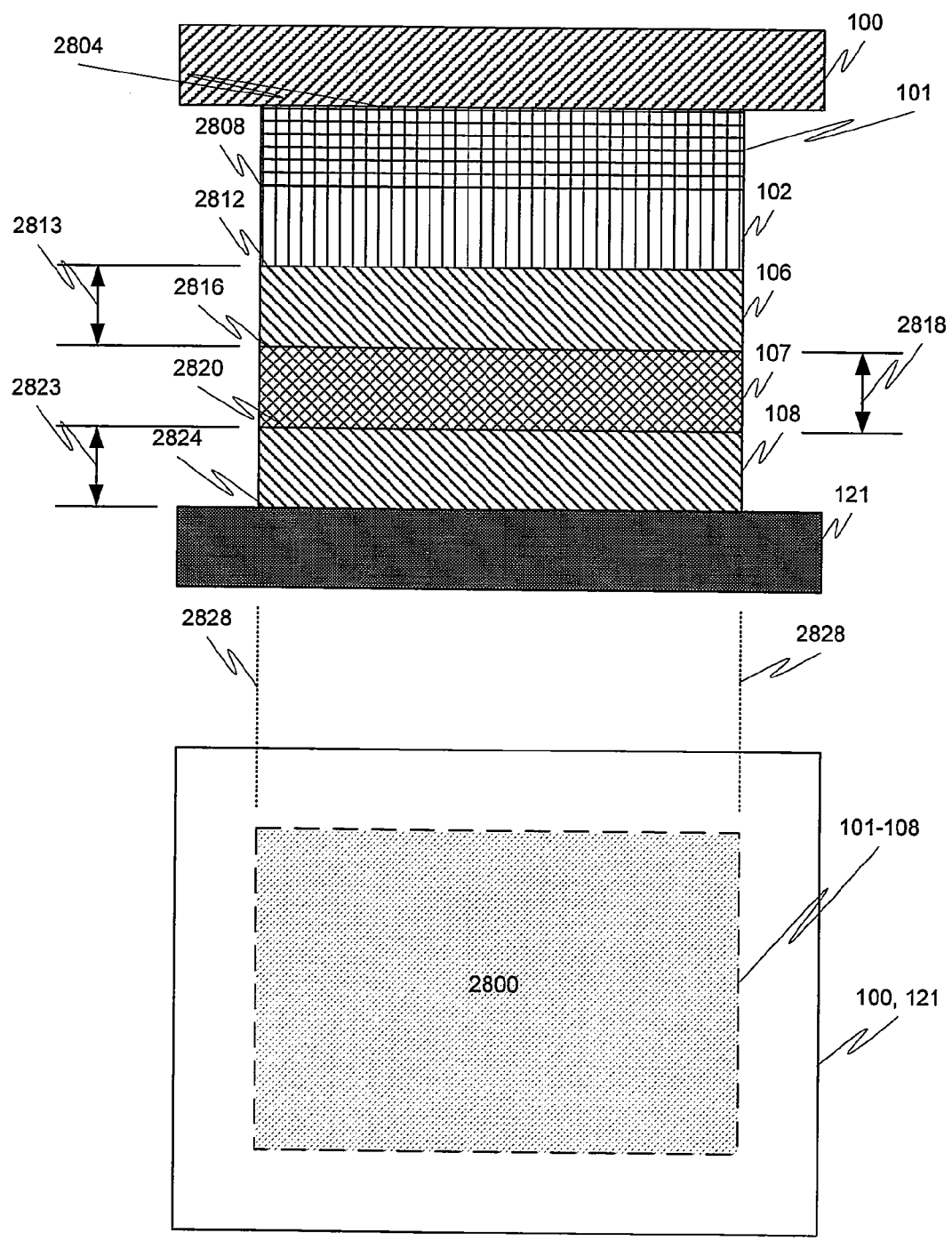
FIG. 28 depicts a cross-sectional and plan view of flocked product of FIG. 1.

FIG. 28 depicts an areal extent 2800 for one of a) a surface area defined by an area of the first adhesive in contact with the flock fibers 120 (hereafter first areal extent) and/or b) a surface area of elastomeric film 107 (hereafter second areal extent). The first 106 and second 108 adhesive films are, respectively, substantially continuously distributed over areal the first and second extents 2800. Although the first and second areal extents are shown as being conterminous, this is not necessarily the case. The first and second areal extents can have differing sizes. In one embodiment, the first 106 and second 108 adhesive films are, respectively, substantially elastic and continuous over the first areal extend. In another embodiment, the first 106 and second adhesive films are, respectively elastic and continuous over the second areal extent.

The first adhesive film 106 has opposing upper 2812 and lower 2816 first adhesive interfaces and a first adhesive film thickness 2813. Furthermore the second adhesive film 108 has opposing upper 2820 and lower 2824 second adhesive interfaces and a second adhesive film thickness 2823. In a preferred embodiment, the first 106 and second 108 adhesive films are substantially free of holes and/or voids, respectively, extending through the first 2813 and second 2823 adhesive thicknesses. That is, the first 106 and second 108 adhesive films are substantially continuously distributed and substantially free of holes and/or voids extending through their respective (2813 and 2823) film thicknesses and throughout their areal extents 2800. Substantially free of holes and/or voids means that on a macroscopic level (that is, not a microscopic and/or molecular level) one or both of the first 106 and second 108 adhesive film thicknesses, respectively, 2813 and 2823 are respectively greater than zero substantially over at least most, if not all, locations of areal extents 2800. Stated another way, in preferred embodiment, the first 106 and second 108 adhesive films, respectively, have fewer than about 10, even more preferably, no more than about 5, and even more preferably, no more than about 1, and even more preferably, no holes and/or voids, visible to an un-aided eye of ordinary human observer per square centimeter surface area of the areal extent 2800. In a more preferred embodiment, the first 106 and second 108 adhesive films each, respectively, have no more than about 1 hole and/or void visible to an un-aided eye of ordinary human observer over the surface area of the areal extent 2800.

In another embodiment, the upper 2812 and lower 2816 first adhesive interfaces are substantially free of interfacial voids and/or valleys. Furthermore, the upper 2820 and lower 2824 second adhesive interfaces are substantially free voids and/or valleys. That is, the upper 2812 and lower 2816 first adhesive interfaces are substantially planar and/or flat. Furthermore, the upper 2820 and lower 2824 second adhesive interfaces are substantially planar and/or flat.

Each of the first 106 and second 108 adhesive films have a minimum and maximum film thickness value. In one embodiment, the minimum film thickness will be no less than about 25% of the maximum film thickness for one or both of the first 106 and second 108 adhesive films. In a preferred embodiment, the minimum film thickness will be no less than about 50% of the maximum film thickness for one or both of the first 106 and second 108 adhesive films. In a more preferred embodiment, the minimum film thickness will be no less than about 75% of the maximum film thickness for one or both of the first 106 and second 108 adhesive films. In an even more preferred embodiment, the minimum film thickness will be no less than about 90% of the maximum film thickness for one or both of the first 106 and second 108 adhesive films.

Figure 29:
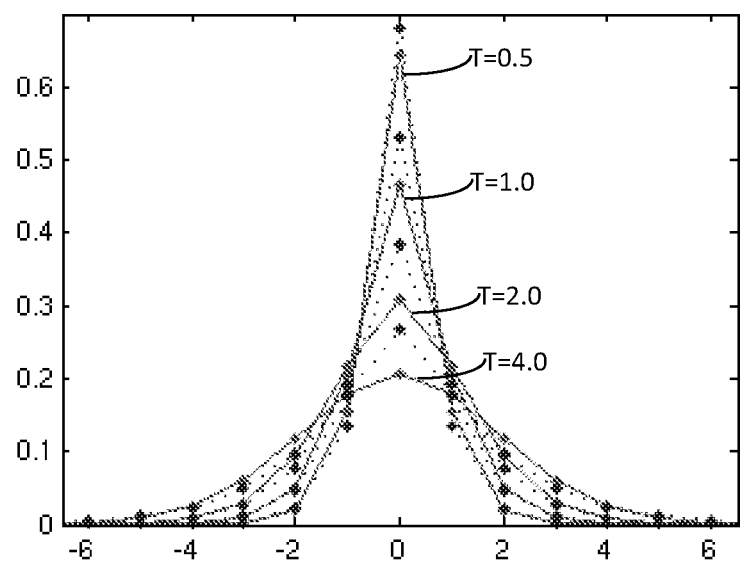
FIG. 29 depicts a Gaussian distribution having various t values.

In yet another embodiment, a plurality of film thickness values measured over the areal extent 28000 for one or both of the first 106 and second 108 adhesive films may be represented in distribution resembling a Gaussian distribution having a "t" value of less than about 4 (FIG. 29). In preferred embodiment the "t" value for the Gaussian distribution of the plurality of adhesive film thickness values for one or both of the first 106 and second 108 adhesive films is less than about 2, even more preferred the "t" value is less than about 1. In yet an even more preferred embodiment, the "t" value for the Gaussian distribution of the plurality of adhesive film thickness values for one or both of the first 106 and second 108 adhesive films is less than about 0.5.

In another embodiment, the elastomeric properties of one or both of the first 106 and second 108 adhesive films are substantially independent of any discontinuities that may exist within either of the first 106 or second 108 adhesive films. The elastomeric properties of the first 106 and second 108 adhesive films are substantially due to the chemical and/or physical properties of the adhesive materials respectively comprising the first 106 and second 108 adhesive films. That is, the first 106 and second 108 adhesive films are substantially elastomeric with or without discontinuities present within the first 106 and second 108 adhesive films. The elastomeric film 107 has an elastomeric film thickness 2818 and opposing upper 2816 and lower 2820 elastomeric interfaces. In a preferred embodiment, the elastomeric film 107 is substantially free of holes and/or voids, respectively, extending through the elastomeric thicknesses 2818. That is, the elastomeric film 107 is substantially continuously distributed and substantially free of holes and/or voids extending through its film thicknesses 2818 and throughout its areal extent 2800. Substantially free of holes and/or voids means that on a macroscopic level (that is, not a microscopic and/or molecular level) the elastomeric film thicknesses 2818 is greater than zero substantially over at least most, if not all, locations of areal extent 2800. Stated another way, in preferred embodiment, the elastomeric film 107 has fewer than about 10, even more preferably, no more than about 5, and even more preferably, no more than about 1, and even more preferably, no holes and/or voids, visible holes and/or voids visible to an un-aided eye of ordinary human observer per square centimeter surface area of the areal extent 2800. In a more preferred embodiment, the elastomeric film 107 has no more than about 1 hole and/or void visible to an un-aided eye of ordinary human observer over the surface area of the areal extent 2800.

In another embodiment, the upper 2816 and lower 2820 elastomeric interfaces are substantially free of interfacial voids and/or valleys. That is, the upper 2816 and lower 2820 elastomeric interfaces are substantially planar and/or flat.

The elastomeric film 107 has a minimum and maximum elastomeric film thickness value. In one embodiment, the minimum elastomeric film thickness will be no less than about 25% of the maximum elastomeric film thickness. In a preferred embodiment, the minimum elastomeric film thickness will be no less than about 50% of the maximum elastomeric film thickness. In a more preferred embodiment, the minimum elastomeric film thickness will be no less than about 75% of the maximum elastomeric film thickness. In an even more preferred embodiment, the minimum elastomeric film thickness will be no less than about 90% of the maximum elastomeric film thickness.

In yet another embodiment, a plurality of film thickness values measured over the areal extent 2800 for the elastomeric film 107 may be represented in distribution resembling a Gaussian distribution having at value of less than about 4 (FIG. 29). In preferred embodiment the t value for the Gaussian distribution of the plurality of elastomeric film thickness values is less than about 2, even more preferred the t value is less than about 1. In yet an even more preferred embodiment, the t value for the Gaussian distribution of the plurality of elastomeric film thickness values is less than about 0.5.

In another embodiment, the elastomeric properties of elastomeric film 107 are substantially independent of any discontinuities that may exist within the elastomeric film 107. The elastomeric properties of the elastomeric film 107 are substantially due to the chemical and/or physical properties of the elastomeric materials comprising the elastomeric film 107. That is, the elastomeric film is substantially elastomeric with or without discontinuities present within the elastomeric film 107.

The phrase "substantially continuous" means that a film or layer substantially covers and/or coats the entire areal interface 2800 of a surface over which the film or layer is said to be substantially continuous. Moreover, "substantially continuous" means the film or layer is substantially free of holes and/or voids.

The flock fibers 102 have a flock fiber length and opposing first 103 and second 104 fiber ends. The first fiber ends 103 of the flock fibers 102 are embedded in the first adhesive film 106. The plurality of flock fibers 102 are adhered to the self-supporting, elastomeric adhesive layer 105 by the first fiber ends 102. Preferably, at least some of the flock fiber length is embed in first adhesive film 106. More preferably, at least one of less than about 25%, 15%, 10%, 5%, and 3% of the fiber length is embedded in the first adhesive film 106. It can be appreciated that, the fiber length embedded in the first adhesive film 106 depends on one or both the pressure applied to embed the flock fiber into the first adhesive film 106 and the first adhesive 106 physical properties during the embedding process. The second fiber ends 104 of the flock fibers 102 are in contact with the release adhesive 101. The second fiber ends 104 of the plurality of flock fibers 102 are adhered to the first carrier sheet 100 by the release adhesive 101.

The first carrier sheet 100 may be any material that is dimensionally stable under the conditions of temperature and pressure encountered during any of the processing conditions presented herein. Preferably, the first carrier sheet 100 is a porous film, such as a porous film discussed by Pekala in U.S. Pat. No. 6,025,068. A particularly preferred the porous sheet is sold by PPG Industries Inc. under the trade name TESLIN™. Battery separator membranes may also be used as the first carrier sheet 100. Examples include Daramic Industrial CL™ sold by Daramic, Inc., and the battery separator membranes sold by Celgard or by Daramic, Inc. under the trade name Artisyn™. Artisyn™ is an uncoated, mono-layer, highly filled polyolefin sheet. Typically, but not always, the first carrier sheet 100 is a discontinuous as opposed to a continuous sheet on a running web line. The first carrier sheet 100 may be any low-cost, dimensionally stable substrate, such as paper, plastic film, and the like, preferably in the form of a discontinuous sheet or a running web line material.

The release adhesive 101 is selected such that the bonding force between the release adhesive 101 and the plurality of flock fibers 102 is less than the bonding force between the self-supporting, elastomeric adhesive layer 105 and the plurality of flock fibers 102. The release adhesive 101 may be any adhesive that adheres more strongly to the first carrier sheet 100 than the plurality of flock fibers 102 but adheres to both enough to hold them together. For example, the release adhesive 101 may be any temporary adhesive, such as a resin or a copolymer, e.g., a polyvinyl acetate, polyvinyl alcohol, polyvinyl chloride, polyvinyl butyral, acrylic resin, polyurethane, polyester, polyamides, cellulose derivatives, rubber derivatives, starch, casein, dextrin, gum arabic, carboxymethyl cellulose, rosin, silicone, or compositions containing two or more of these ingredients. Preferably, the release adhesive 101 is a water-based adhesive, that is the release adhesive 101 is one or more of dispersed, dissolved, suspended or emulsified within water.

The plurality of flock fibers 102 may be formed from any natural or synthetic material. Synthetic material includes, without limitation, vinyl, rayons, nylons, polyamides, polyesters such as terephthalate polymers, such as poly(ethylene terephthalate) and poly(cyclohexylene-dimethylene terephthalate), and acrylic, and natural material includes cotton and wool. In one configuration, a conductive coating or finish is applied continuously or discontinuously over the exterior surface of the flock fibers 102 to permit the flock fibers 102 to retain an electrical charge. The flock fibers 102 may be pre-colored (yarn-dyed or spun dyed) before contacting one or both of the release adhesive 101 or the self-supporting, elastomeric adhesive layer 105 or after the first carrier sheet 100 is removed, such as by sublimation dye transfer printed.

Preferably at least most, and even more preferably at least about 75%, and even more preferably all, of the flock fibers 102 have a preferred denier of no more than about 60, more preferably no more than about 25, and even more preferably no more than about 5, with a range of from about 1.5 to about 3.5 being typical and have a titre ranging from about 0.5 to about 20 Dtex (from about 0.5 to about $20 \times 10^{-7}$ Kg/m) and even more preferably from about 0.9 Dtex to about 6 Dtex. The length of at least most, and typically at least about 75%, of the flock fibers 102 is preferably no more than about 4 mm, more preferably no more than about 2 mm, and even more preferably no more than about 1 mm, with a range of from about 0.3 to about 3.5 mm being typical. The flock fiber placement density relative to the surface area of the flocked portion (on which the flock is deposited) of the flocked product 109 is preferably about 50% fibers/in$^2$, even more preferably at least about 60% fibers/in$^2$, and even more preferably at least about 70% fibers/in$^2$ of the flocked surface area.

In one embodiment, the self-supporting, elastomeric adhesive layer 105 may be supplied as a tri-laminate film. The self-supporting, elastomeric adhesive layer 105 may be supplied with or without a second carrier sheet 121. Preferably, the second carrier sheet 121 is positioned on at least one of the first 106 and second 108 adhesive films. The second carrier sheet 121 may comprise any of the materials described above for the first carrier sheet 100.

In another embodiment, the self-supporting, elastomeric adhesive layer 105 may be supplied as a bi-laminate. In one configuration, the bi-laminate may comprise the first 106 and second 108 adhesive films without the elastomeric film 107 therebetween. In another configuration, the bi-laminate may comprise the first adhesive film 106 and the elastomeric film 107. When the bi-laminate comprises the first adhesive film 106 and the elastomeric film 107, one of ordinary skill in art would understand that the second adhesive film 108 may be provided during one of the processes and/or systems described herein to form the tri-laminate self-supporting, elastomeric layer 105 within the products, articles, processes and systems described herein.

At least one, if not both, of self-supporting, elastomeric layer 105 and the elastic film 107 should be durable, thermally stable, and able to resist the various treatments including but not limited to flocking and/or lamination process, applying chemicals, washing, heating, drying, both during the flocking process and after the design or transfer has been heat applied to the article. The terms "elastic" and "elastomeric" as used herein means those materials that have the ability to regain, at least substantially, their original shape after a load is removed. The elastic film preferably has a modulus of elasticity of less than about 11.25 pounds per foot ("lbf") (50 N). The modulus of elasticity for the material selected is preferably above about 0.5 lbf (2.22 N) (where the modulus is defined as the force required to pull a ¼ inch sample from 3 inches to 6 inches). As the modulus of elasticity (sometimes also referred to as Young's Modulus) is a fundamental material constant, the modulus is an index of the stiffness of the material. A higher value of the modulus indicates a more brittle material (i.e. glass, ceramics). A very low value represents an elastomeric material (i.e. rubber). The elastic film preferably has an elongation of at least about 200% and more preferably at least about 300% and a recovery of at least about 75% and more preferably at least about 95%. The recovery is the percent of the film's shape retained after the film is stretched to 100% of its original length at a rate of 30 inches per minute and the stretched film allowed to retract freely for 1 minute.

In another embodiment, the self-supporting, elastomeric adhesive layer 105 may be formed by applying (such as, printing, screen-printing, applying, or depositing) the first adhesive film 106 to a base material (such as, but not limited to the second carrier sheet 121, an item of apparel, or item of commerce). Thereafter, contacting and/or applying the second adhesive film 108 to the elastomeric film 107, such that the first 106 and second 108 adhesive films are positioned on opposing surfaces of the elastomeric film 107. It can be appreciated that, the self-supporting, elastomeric adhesive layer 105 may be formed by different processes, such as, but not limited to: a) applying and/or contacting the first adhesive film 106 with the elastomeric film 107 prior to contacting and/or applying the first adhesive film 106 to the base material; b) applying and/or contacting the second adhesive film 108 with the elastomeric film 107 prior to contacting and/or applying elastomeric film 107 with the first adhesive film 106; or c) substantially contacting and/or forming (such as by extrusion) the elastomeric film 107 with the first 106 and second 108 adhesive films. In a preferred embodiment, the first 106 and second 108 adhesive films are applied as water-based suspensions, emulsions, or dispersions. The first 106 and second 108 adhesive films further form as the water is removed (through evaporation or applying of heat) from the as applied water-based suspensions, emulsions, or dispersions.

In a preferred embodiment, each of the first 106 and second 108 adhesive films comprise one of a thermosetting, a thermoplastic or combination thereof adhesive. Preferably, the first 106 and second 108 adhesive films comprise thermoplastic adhesives. Thermoplastic means the material will repeatedly soften when heated and hardened with cooled. Thermosetting means the material will undergo or has undergone a thermosetting chemical reaction by the action of heat, catalyst, ultraviolet energy or such. The thermosetting chemical reaction forms a relatively infusible state. The first 106 and second 107 adhesive films may be the same or differ in one or more chemical and/or physical properties. Preferably, the first 106 and second 107 adhesive films have substantially the same chemical and/or physical properties. A chemical property means any chemical reactivity property associated with the first 106 and second 108 adhesive films. A physical property means any property not associated with a chemical change in the substance and/or one or more substances associated with the first 106 and second 108 adhesive films. Non-limiting examples of physical properties are: absorption, concentration, density, dielectric, ductility, fluidity, fluid flow, malleability, melt and/or softening point, permeability, solubility, specific heat, viscosity, shear, stress, recovery, elasticity, and melt flow index. Non-limiting examples of chemical properties are: composition, bond structure, chemical stability. More preferably, the first 106 and second 108 adhesive films substantially comprise substantially the same thermoplastic adhesive compositions.

Suitable thermoplastic adhesive compositions comprise homopolymers, copolymers or polymer alloy comprising one or more of polyolefins, polystyrenes, polyvinyls, polyacrylics, polyhalo-olefins, polydienes, polyoxides, polyesthers, polyacetals, polysulfides, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polysiloxanes, polysilanes, polyphosphazenes, polyketones, polythioketones, polysulfones, polysulfoxides, polysulfonates, polysulfoamides, polyphylenes, and combinations and/or mixtures thereof. More specifically in a preferred embodiment, the thermoplastic adhesive composition comprises one of acrylonitrile butadiene styrene, acrylic (PMMA), celluloid, cellulose acetate, cycloolefin copolymer, ethylene-vinyl acetate (EVA), ethylene vinyl alcohol (EVOH), fluoroplastic (PTFE, FEP, PFA, CTFE, ECTFE, and/or ETFE), ionomer, liquid crystal polymer (LCP), polyacetal (POM and/or acetal), polyacrylate (acrylic), polyacrylonitrile (PAN or acrylonitrile), polyamide (PA or nylon), polyamide-imide (PAI), polyaryletherketone (PAEK and/or ketone), polybutadiene (PBD), polybutylene (PB), polybutylene terphthalate (PBT), polycaprolactone (PCL), polychlorotrifluoroethylene (PCTFE), polyethylene terephthalate (PET), polycycloheylene dimethylene terephthalate (PCT), polycargonate (PC), polyhydroxylalkanoate (PHA), polyketone (PK), polyester, polyethylene (PE), polyetherketoneketone (PEKK), polyetherimide (PEI), polyethersulfone (PES), polysulfone, polyethlenechloriate (PEC), polyimide, polyacetic acid (PLA), polymethylpentene (PMP), polyphenylene oxide (PPO), polyphylene sulfide (PPS), polyphthalamide (PPA), polypropylen (PP), polystyrene (PS), polsulfone (PSU), polytrimethylen terphthalate (PTT), polyurethane (PU), polyvinyl acetate (PVA), polyvinyl chloride (PVC), polyvinylidene chloride (PVDC), styrene-acrylonitriel (SAN), and combinations thereof. In an even more preferred embodiment, the thermoplastic adhesive comprising the first 106 and second 108 adhesive films comprise one or more of polyurethane, polyvinyl acetate, polyamide, polyacrylate and combinations thereof. In a more preferred embodiment, the thermoplastic adhesive comprising the first 106 and second 108 adhesive films comprise polyurethanes.

The self-supporting, elastomeric adhesive layer 105 has one or more of a modulus, thickness and recovery value. The modulus refers to the force required to pull at a specific sample gauge of a 25.4 mm wide sample, respectively, to 40% and 100%. The recovery refers to the percent of shape retained after being stretched at a rate of 304 mm per minute and allowed to retract freely for a single minute to 100% of its original length. The melt flow index refers to the rate of molten adhesive flow at 175 degrees Celsius under 2.17 kg load. Preferred modulus values are given in Table I. The recovery value for the self-supporting, elastomeric adhesive layer 105 is at least about 75%, preferably at least about 90%. More preferably, the recovery value for the self-supporting elastomeric adhesive layer 105 is at least about 95%, even more preferably at least about 99%.

phases, a glass transition temperature less than ambient temperature, and viscoelastic and/or elastic physical properties.

In one configuration, the first and/or second adhesive films 106 and 108 have one or more properties similar to those of the elastomeric film 107 (e.g., and/or the one or more properties of the films 106, 107, and 108 fall within the numerical ranges set forth above for the elastomeric film 107).

Figure 2:
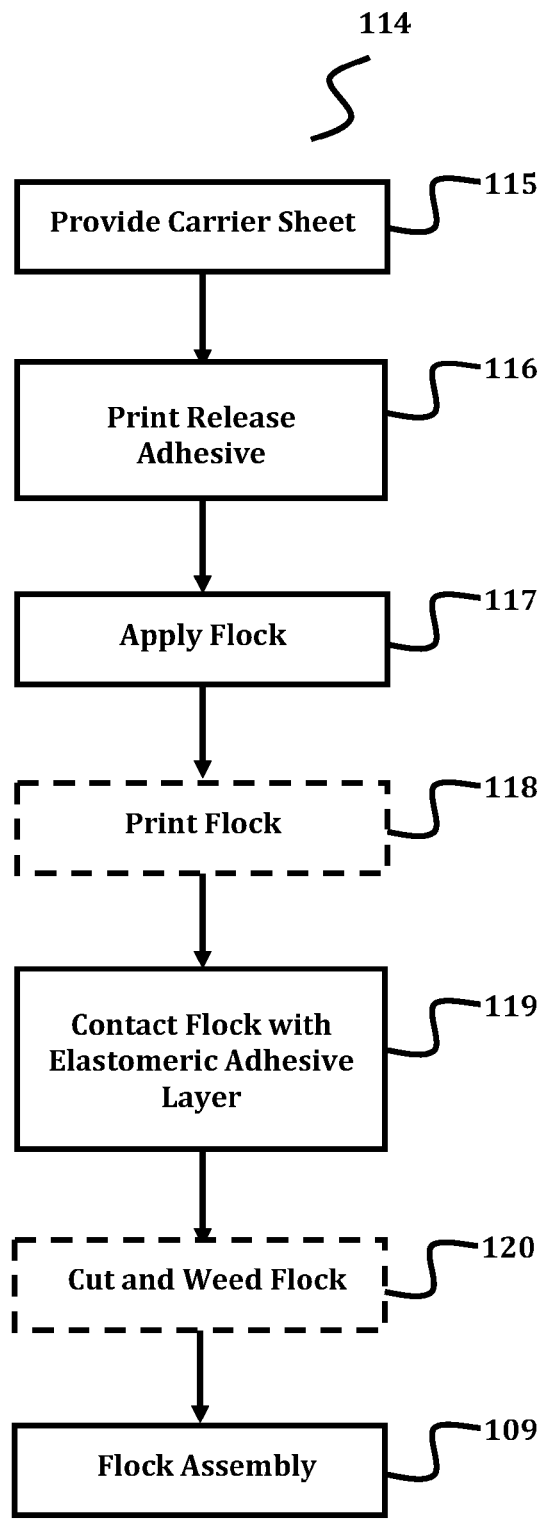
FIG. 2 depicts a first process for making the flocked product depicted in FIG. 1 according to an embodiment of the present invention.

FIG. 2 depicts a first process 114 for making the flocked product 109.

In step 115, the first carrier sheet 100 is provided. In step 116, the release adhesive 101 is applied to the first carrier sheet 100. The release adhesive 101 is applied to the first carrier sheet 100 by any process well known to those of ordinary skill within the art. Preferably, the release adhesive 101 is applied to the first carrier sheet 100 by a printing process, more preferably by a screen-printing process. The screen-printing process prints the release adhesive 101 on the carrier sheet in a desired pattern.

TABLE I

Modulus Values

| Composition | A | B | C | D | E | F | G | H | I |
|---|---|---|---|---|---|---|---|---|---|
| Bi or Tri Layer | Bi | Bi | Bi | Bi | Bi | Bi | Bi | Tri | Tri |
| Thickness | 18 μm | 50 μm | 75 μm | 50 μm | 50 μm | 50 μm | 200 μm | 200 μm | 100 μm |
| @40% | 1.2N | 7.6N | 6.2N | 4.5N | 1.8N | 3.6N | 5.2N | 19.6N | 7.7N |
|  | (0.3 lbs) | (1.7 lbs) | (1.4 lbs) | (1.0 lbs) | (0.4 lbs) | (0.8 lbs) | (1.2 lbs) | (4.4 lbs) | (1.7 lbs) |
| @100% | 1.6N | 8.9N | 8.96N | 7.1N | 3.6N | 6.2N | 7.2N | 25.4N | 10.2N |
|  | (0.4 lbs) | (2.0 lbs) | (2.0 lbs) | (1.6 lbs) | (0.8 lbs) | (1.4 lbs) | (1.6 lbs) | (5.7 lbs) | (2.3 lbs) |

The first 106 and second 108 adhesive films have one or more of melt flow index and softening point. The softening point refers to the temperature at which the adhesive becomes one or more of tacky, soft to the touch and/or pliable at a pressure of from about 1 psi to about 100 psi, preferably at a pressure from about 5 psi to about 50 psi, more preferably, at a pressure from about 10 psi to about 40 psi. Preferably, the softening point of one or both of the first 106 and second 108 adhesive films ranges from about 50 degrees Celsius to about 140 degrees Celsius, more preferably the softening point ranges from about 60 degrees Celsius to about 100 degrees Celsius. Even more preferably, the softening point of one or both of the first 106 and second 108 adhesive films ranges from about 75 degrees Celsius to about 85 degrees Celsius. The melt flow index is measured at 175° C. under a 2.16 kg mass. The melt flow index for first and second adhesive films is from about 5 dg/min to about 100 dg/min. Preferably, the melt flow index is form about 10 dg/min to about 60 dg/min. More preferably, the melt flow index for the first and second adhesive films is from about 35 dg/min to about 50 mg/min.

The elastomeric film 107 comprises a polymeric material. The polymeric material may be one of a thermoplastic material, a thermosetting material and a combination of thermoplastic and thermosetting polymeric materials. In a preferred embodiment, the elastomeric film 107 comprises one of styrene-buatdiene rubber, polyputadinene, ethylene-propylen rubber, butyl and halobutyl rubber, nitrile rubber, hydrogenate ntirile rubber, acrylic elastomers (such as, but not limited to ACM, AEM and EEA), chlorinate polyethylene elastomers, chloroprene elastomers, chlorosulfonated polyethylene elastomers, epichlorohydrin elastomers, fluoroelastomers, flurosilicone elastomers, polysulfide elastomers, silicone elastomers, urethane elastomers, vinyl acetate copolymer elastomers, and combinations thereof.

Preferably, the elastomeric film 107 is polymer having one of more of the following properties: at least some amorphous In step 117, a plurality of flock fibers 102 is applied to release adhesive 101. Preferably, the plurality of flock fibers 102 is applied to the release adhesive 101 by an electrostatic deposition process. The process for adhering flock to a release adhesive positioned on a carrier sheet is described in U.S. Pat. Nos. 4,810,549; 5,207,851; 6,110,560; 7,344,769; and 7,364,782 all to Abrams, each of which is incorporated in its entirety herein by this reference.

In optional step 118, the plurality of flock fibers 102 may be dyed, preferably, by a sublimation dye transfer process. Suitable sublimation dye transfer processes are described in U.S. Pat. No. 7,413,581, which is incorporated in its entirety herein by this reference.

In step 119, the plurality of flock fibers 102 is contacted with the self-supporting, elastomeric adhesive layer 105 to form an intermediate product. More specifically, the plurality of flock fibers 102 is contacted with the first adhesive film 106 of the self-supporting, elastomeric adhesive layer 105. Even more specifically, the first fiber ends 103 are in contact with the first adhesive film 106 and the second fiber ends 104 are in contact with the release adhesive 101.

Preferably, the contacting step 119 includes, before, after, or substantially simultaneously, applying one or both of heat and pressure. One or both of the heat and pressure substantially embeds the first fiber ends 103 into the first adhesive film 106. Heat is applied to at least one of the first carrier sheet 100 and the self-supporting, elastomeric layer 105. Preferably, substantially enough heat is applied to at least soften, if not at least partially melt, the first adhesive film 106. While not wanting to be bound by any theory, it is believed that the embedding of the first fiber ends 103 into the first adhesive film 106 substantially adhesive bonds the flock fibers to the first adhesive film 106 by one or more of the following adhesive processes: mechanical, electrostatic, adsorption, chemisorption, diffusion, or a combination thereof. Preferably, the first fiber ends 103 are adhered to the first adhesive film 106 by at least some, if not mostly, a mechanic adhesive process.

In an embodiment, the first adhesive film 106 softens and/or partially melts at a first adhesive film temperature from about 50° C. to about 140° C. Preferably, the first adhesive film temperature is from about 60° C. to about 100° C. More preferably, the first adhesive film softens and/or partially melts at the first adhesive film temperature from about 75° C. to about 85° C. Stated another way, a process line temperature from about 100° C. to about 300° C. may provide sufficient heat to sufficiently soften and/or partially melt the first adhesive film 106. Preferably, the process line temperature is from about 175° C. to about 275° C. More preferably, the process line temperature to at least sufficiently soften and/or partially melt the first adhesive film 106 is from about 200° C. to about 250° C. A process line temperature means the temperature applied during at least the applying of heat.

The pressure applied to embed the first fiber ends into the first adhesive film 106 is from about 0.1 bar to about 10 bar, preferably from about 0.5 bar to about 5 bar. More preferably, the pressure applied to embed the first fiber ends into the first adhesive film 106 is from about 0.7 bar to about 1.5 bar.

In optional step 120, the intermediate product is cut and the flock fibers are weeded from the cut intermediate product. The cutting process may be any suitable cutting device known to a person of ordinary skill within the art, such as a steel-rule dies, hard tool metal dies, laser cutter, ultrasound cutter, high frequency cutter, hot-wire cutter, or water jet cutter. The weeding process may be by any suitable process know to one of ordinary skill within the art, such as manual, mechanical, or vacuum removal of unwanted portions. Preferably, the cut portions being retained form the flock transfer 109. More preferably, the retained portions are associated with at least one of the first carrier sheet 100 and self-supporting, elastomeric adhesive layer 105.

Optional steps 118 and 120 may be preformed in any order with respect to step 119. While not wanting to be limited by example, steps 118, 119 and 120 may be preformed in one of the following sequences (presented in order of first to third): a) 118, 119, 120; b) 119, 118, 120; c) 120, 118, 119; d) 120, 119, 118; e) 118, 120, 119; or f) 119, 120, 118. Furthermore, steps 118 and 120 may be preformed substantially simultaneously, that is, the heat and pressure applied during sublimation printing may be sufficient to substantially embed the first fiber ends 103 into the first adhesive film 106.

Figure 3:
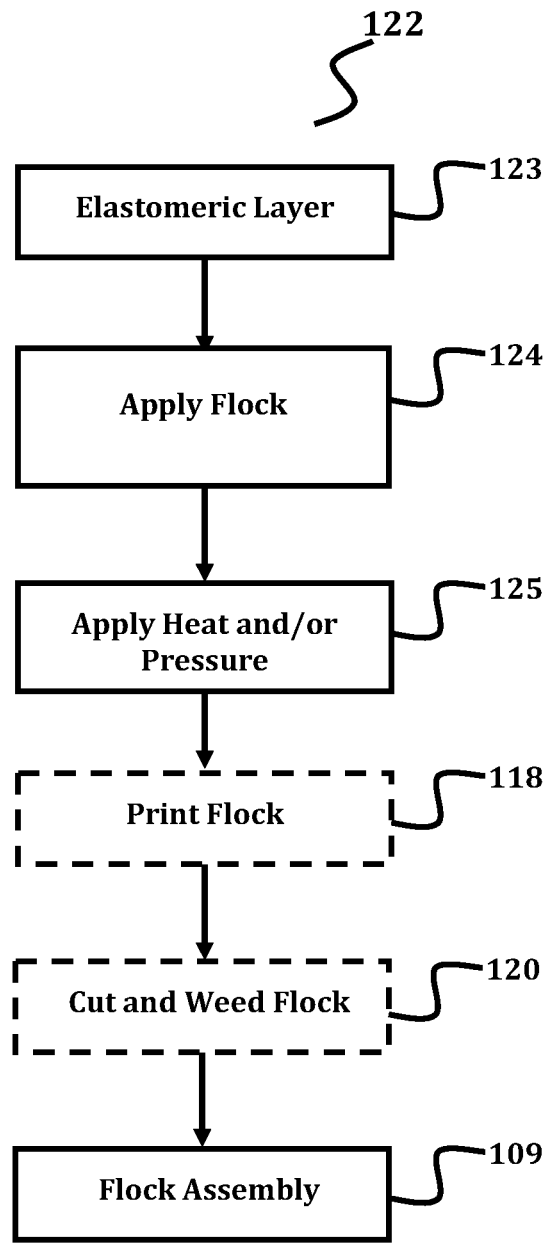
FIG. 3 depicts a second process for making the flocked product depicted in FIG. 1 according to another embodiment of the present invention.

FIG. 3 depicts a second process 122 for making the flocked product 109.

In step 123, the self-supporting, elastomeric adhesive layer 105 is provided. Preferably, the self-supporting, elastomeric adhesive layer 105 has the optional second carrier sheet 121. Preferably, the second carrier sheet 121 is reversibly adhered to the second adhesive film 108.

In step 124, the plurality of flock fibers 102 are contacted with the first adhesive film 106. Preferably, the contacting of the plurality of flock fibers 102 is an electrostatic flock deposition and/or printing process. The electrostatic flock process is described in U.S. Pat. Nos. 4,810,549; 5,207,851; 6,110,560; 7,344,769; and 7,364,782, each of which is incorporated in its entirety herein by this reference.

In step 125, one or both of heat and pressure are applied to at least one of the plurality of flock fibers 102 and the self-supporting, elastomeric adhesive layer 105. One or both of the heat and pressure substantially embeds the first fiber ends 103 into the first adhesive film 106 to form the flocked product 109.

Preferably, substantially enough heat is applied to at least soften, if not at least partially melt, the first adhesive film 106.

As described above for the first process 114, the heat and pressure may be applied substantially during and/or after contacting step 124. It can be appreciated that, the self-supporting, elastomeric adhesive layer 105 may be pre-heated prior to contacting step 124 and/or the applying of pressure. The degree of heat and/or pressure applied to embed the first fiber ends 103 into the first adhesive fiber 106 is as described above for first process 114.

The second process 122 may optionally include the sublimation dying 118 and cutting/weeding 120 steps as described above for process 114. Furthermore, optional steps 118 and 120 may be carried-out in any sequence with respect to steps 124 and/or 125 as presented above for process 114. Moreover, steps 118 and 125 may be preformed substantially simultaneously, that is, the heat and pressure applied during sublimation printing may be sufficient to substantially embed the first fiber ends 103 into the first adhesive film 106.

Figure 4A:
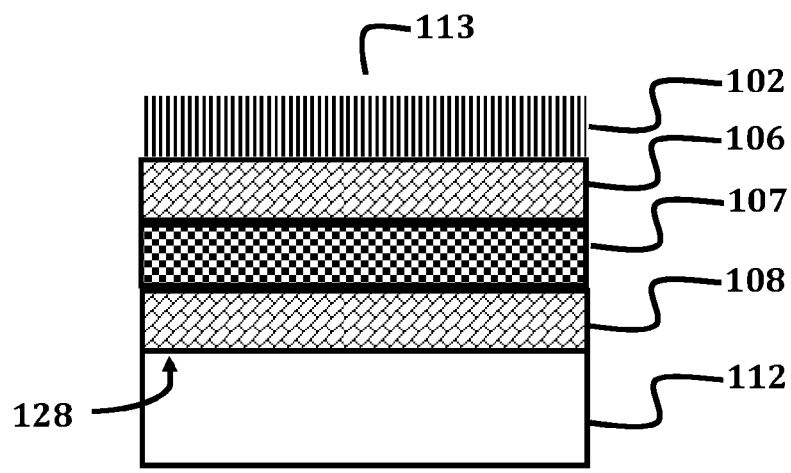
FIGS. 4A-4C are cross-sectional views of flocked products according to various embodiments of the present invention.
Figure 4B:
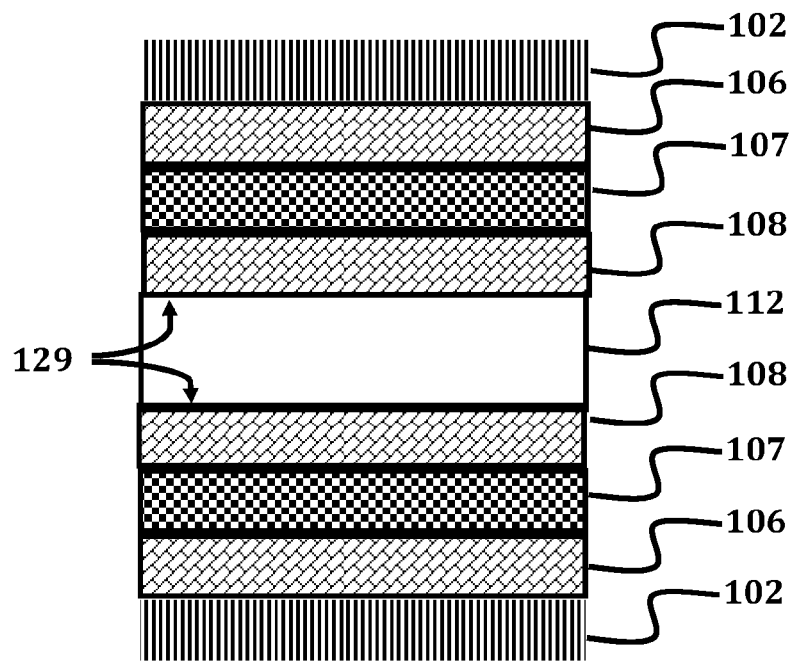
Figure 4C:
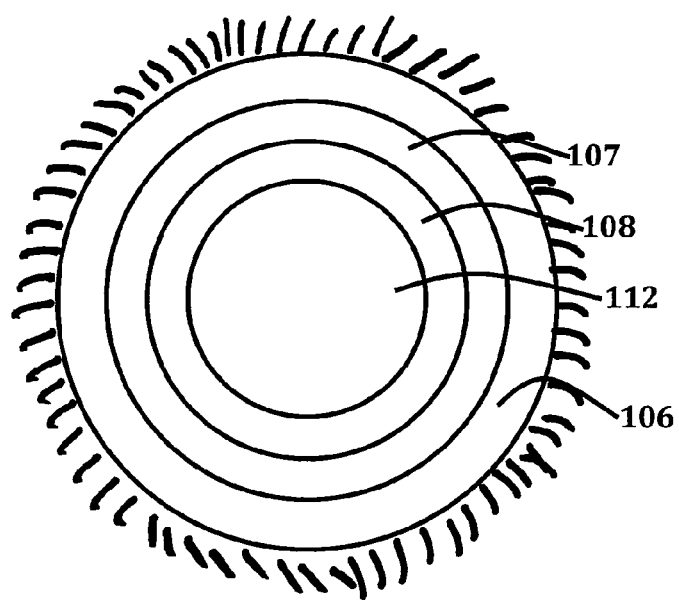

FIGS. 4A-4C depict, non-limiting cross-sectional views of various forms of a flock article 113 of the present invention. Each of the various forms of the flock article 113 comprises a substrate 112 having flock fibers 102 adhered to the substrate 112 by the self-supporting, elastomeric adhesive layer 105. The plurality of flock fibers 102 is orientated substantially perpendicular to the self-supporting, elastomeric adhesive layer 105. The first fiber ends 103 are embedded in the first adhesive film 106 of the self-supporting, elastomeric adhesive layer 105. The second adhesive film 108 is contact with and/or adhered to the substrate 112. The elastomeric film 107 is positioned between the first 106 and second 108 adhesive films.

The substrate 112 may comprise any material. Non-limiting examples of suitable substrate materials 112 comprise metallic materials, synthetic or natural polymeric materials, glass-based materials, ceramic materials, leather-based materials and combinations thereof and may or may not be stretchable and/or have elastic properties. In a preferred embodiment, the substrate 112 comprises a stretchable and/or elastomeric material. Preferably, the substrate 112 comprises one or both of an elastomeric polymeric material and a stretchable-knit and/or stretchable-weave material.

Non-limiting examples of elastomeric polymeric materials comprise one or more of rubbers, polyisoprenes, polybutadinenes, styrene-butadienes, chloroprenes, ethylene propylene rubbers, ethylene-vinyl acetates, ethylene propylene diene rubbers, polyacrylic rubbers, epichlorohydrin rubbers, fluorosilicones, fluoroelasters, silicones, perfluoroelastomers, polyether block amides, chlorosulfonated polyethylenes and combinations thereof). Non-limiting examples of stretchable-knits/stretchable-weaves are sprang waves, mesh-weaves, open weaves, warp knits, and two-way knits. While not wanting to be limited by example, suitable stretchable-knits/stretchable-weave textile materials are Lycra™, Spandex™, 4-way stretch fleece fabrics, and stretch cotton weaves (such as, stretch rayon jersey knit and/or cotton/Lyrca™ combinations).

In a preferred embodiment, the substrate 112 comprises an item of apparel, preferably a stretchable and/or bendable item of apparel. Non-limiting examples of stretchable items of apparel are jerseys, leotards, pants, shirts, blouses, leggings, socks, shoes, under garments, and accessories (such as, but not limited to, hair-bands, wrist bands, head bands, finger bands, ankle bands, finger bands, toe-bands, arm bands, and shoe-laces).

The substrate 112 may have a single surface or a plurality of surfaces. Non-limiting examples of a single-surfaced substrate 112 are substrates having one of a generally spherical, circular-donut, and elliptical-donut shapes. Non-limiting examples of substrate shapes having a plurality of substrate surfaces are substrates substantially resembling one of a cube, rectangular-box and tetrahedral shapes.

The various forms of the flocked article 113 depicted in FIGS. 4A and 4C comprise a substrate 112 with the flock fibers 102 adhered to a single substrate surface 128 by the self-supporting, elastomeric adhesive layer 105. The self-supporting, elastomeric adhesive layer 105 is positioned between the plurality of flock fibers 102 and the single substrate surface 128.

The flocked article 113 depicted in FIG. 4B comprises the substrate 112 having a plurality of substrate surfaces 129 with the flock fibers 102 adhered to at least two of the plurality of substrate surfaces 129 by the self-supporting, elastomeric adhesive layer 105 positioned on the at least two of the plurality of the substrate surfaces 129. The self-supporting, elastomeric adhesive layer 105 is positioned between the at least two of the plurality of substrate surfaces 129 and the plurality of flock fibers 102. While FIG. 4B depicts the plurality of substrate surfaces 129 having flock fibers adhered thereto in an opposing relationship, it can be appreciated that the plurality of substrate surfaces having flock fibers adhered thereto may be in any relationship (such as, but not limited to, opposing perpendicular, obtuse, oblique, or other geometric relationship to each other).

Figure 5:
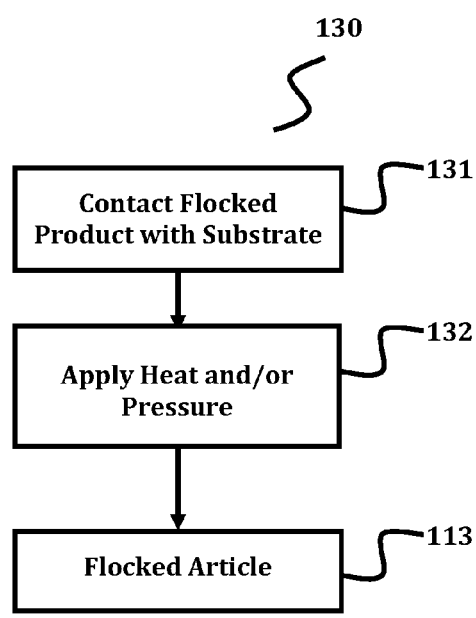
FIG. 5 depicts a process for making some of the flocked articles depicted in FIGS. 4A-4C according to an embodiment of the present invention.

FIG. 5 depicts process 130 for making the flocked article 113.

In step 131, the second adhesive film 108 of the flocked product 109 is contacted with one of the single substrate surface 128 or two or more of the plurality of the substrate surfaces 129. Preferably, the second adhesive film 108 of the flocked product 109 is contacted in registration with the substrate 112. The registration process may be a mechanical and/or electro-optical guided registration process. The flocked product 109 may optionally contain the second carrier sheet 121. If the flocked product 109 contains the second carrier sheet 121, the second carrier sheet 121 is removed prior to contacting the second adhesive film 108 with the substrate 112.

In step 132, one or both of heat and pressure are applied to at least one of the substrate 112 and the flocked product 109 to form the flocked article 113. Preferably, substantially enough heat is applied to at least soften, if not at least partially melt, the second adhesive film 108. While not wanting to be bound by any theory, it is believed that the for the second adhesive film 108 to substantially and/or permanently adhere to the substrate 112, the second adhesive film 108 should be sufficiently softened and/or partially melted to at least flow and/or wet the substrate 112. Furthermore, it is believed the flowing and/or wetting of the substrate 112 by the softened and/or partially melted second adhesive film 108 substantially, permanently binds the second adhesive film 108 to the substrate 112 by one or more of the following adhesion processes: mechanical, electrostatic, adsorption, chemisorption, diffusion, or a combination thereof. Preferably, the second adhesive film 108 is permanently adhered to the substrate 112 by at least some, if not mostly, a mechanical adhesive process.

In an embodiment, the first adhesive film 106 softens and/or partially melts at a first adhesive film temperature from about 50° C. to about 140° C. Preferably, the first adhesive film temperature is from about 60° C. to about 100° C. More preferably, the first adhesive film softens and/or partially melts at the first adhesive film temperature from about 75° C. to about 85° C. Stated another way, a process line temperature from about 100° C. to about 300° C. may provide sufficient heat to sufficiently soften and/or partially melt the first adhesive film 106. Preferably, the process line temperature is from about 175° C. to about 275° C. More preferably, the process line temperature to at least sufficiently soften and/or partially melt the first adhesive film 106 is from about 200° C. to about 250° C. A process line temperature means the temperature applied during at least the applying of heat.

Preferably, the pressure applied is from about 0.1 bar to about 10 bar, preferably from about 0.5 bar to about 5 bar. More preferably, the pressure applied is from about 0.7 bar to about 1.5 bar.

The steps 131 and 132 may be one before the other or substantially simultaneously. In another embodiment, at least one of the substrate 112 and/or second adhesive film 108 (of the flocked product 109) may be heated prior to the contacting step 130. In yet another embodiment, the contacting step 130 may be preformed prior to applying one or both of heat and pressure. In still yet another embodiment, second adhesive film 108 may be heated and contacted with the substrate prior to the application of pressure. One of skill in the art would appreciate that other combinations of contacting and applying heat and/or pressure are possible for adhering the second adhesive film 106 to the substrate 112.

Step 131 may optionally include a sublimation printing process. In another configuration the sublimation printing step may be conducted prior to or after the applying of heat and/or pressure step 131.

Figure 6:
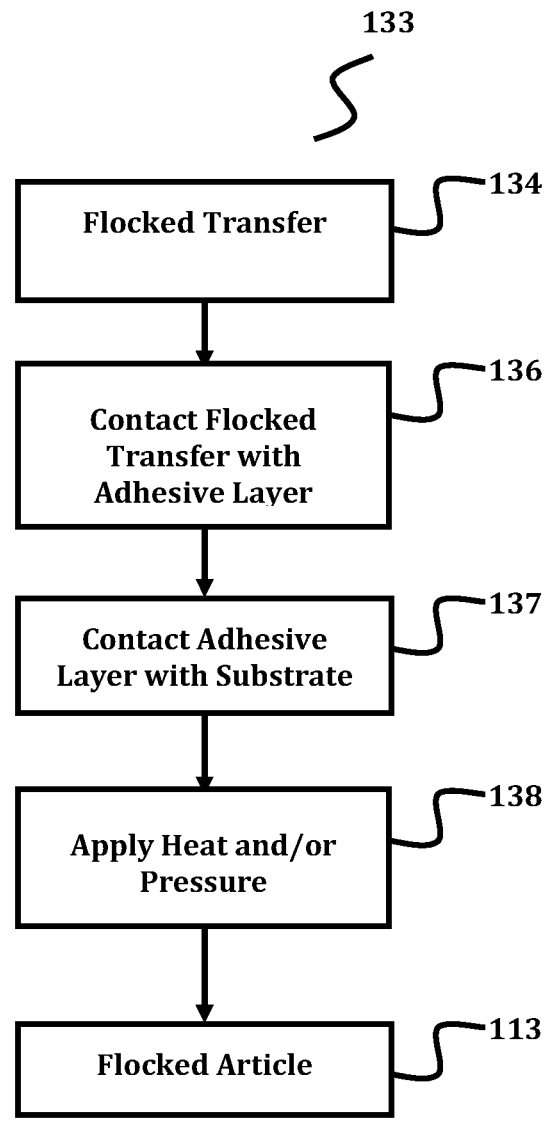
FIG. 6 depicts another process for making some of the flocked articles depicted in FIGS. 41-4C according to another embodiment of the present invention.

FIG. 6 depicts another process 133 for making the flocked article 113.

A flock transfer 135 is provided in step 134. The flock transfer 135 comprises flock fibers 102 adhered to the first carrier sheet 100 by the release adhesive 101. The second fiber ends 104 are adhered to the first carrier sheet 100 by the release adhesive 101.

In step 136, the first fiber ends 103 are contacted with the first adhesive film 106 of the self-supporting, elastomeric adhesive layer 105. The first 103 and second 104 fiber ends are in an opposing relationship. The self-supporting, elastomeric adhesive layer 105 may have the optional second carrier sheet 121 attached to a second surface of the second adhesive film opposing a first surface of the second adhesive film in contact with the elastomeric film 107.

In step 137, the second adhesive film 108 of the self-supporting, elastomeric adhesive layer 105 is contacted with the substrate 112. Preferably, the self-supporting, elastomeric layer 105 is pre-cut to correspond to one or both of the shape and size of the flock transfer 135. It can be appreciated that, when the self-supporting, elastomeric adhesive layer 105 includes the optional second carrier sheet 121, the optional second carrier sheet 121 is removed prior to contacting the second adhesive film 108 with the substrate 112.

In a preferred embodiment, at least one, or optionally both, of the flock transfer 135 and substrate 112 are contacted with the self-supporting, elastomeric adhesive layer 105 substantially in registration. The registration may be a mechanical and/or electro-optical guided registration process. In yet another embodiment, the flock transfer, substrate 112, and self-supporting, elastomeric adhesive layer 105 are contacted substantially simultaneously, preferably substantially simultaneously in registration.

In step 138, one or both of heat and pressure are applied to at least one of the flock transfer 135 and the substrate 112 to form flocked article 113.

Preferably, substantially enough heat is applied to at least soften, if not at least partially melt, the second adhesive film 108. While not wanting to be bound by any theory, it is believed that the for the second adhesive film 108 to adhere to the substrate 112, the second adhesive film 108 should be sufficiently softened and/or partially melted to at least flow and/or wet the substrate 112. It is believed the flowing and/or wetting of the substrate 112 by the softened and/or partially melted second adhesive film 108 substantially adheres the second adhesive film 108 to the substrate 112. It is further believed the second adhesive film 108 is adhered to the substrate 112 by one or more of the following adhesion processes: mechanical, electrostatic, adsorption, chemisorption, diffusion, or a combination thereof. Preferably, the second adhesive film 108 is adhered to the substrate 112 by at least some, if not mostly, by a mechanical adhesive process.

In an embodiment, the first adhesive film 106 softens and/or partially melts at a first adhesive film temperature from about 50° C. to about 140° C. Preferably, the first adhesive film temperature is from about 60° C. to about 100° C. More preferably, the first adhesive film softens and/or partially melts at the first adhesive film temperature from about 75° C. to about 85° C. Stated another way, a process line temperature from about 100° C. to about 300° C. may provide sufficient heat to sufficiently soften and/or partially melt the first adhesive film 106. Preferably, the process line temperature is from about 175° C. to about 275° C. More preferably, the process line temperature to at least sufficiently soften and/or partially melt the first adhesive film 106 is from about 200° C. to about 250° C. A process line temperature means the temperature applied during at least the applying of heat.

Preferably, the pressure applied is from about 0.1 bar to about 10 bar, preferably from about 0.5 bar to about 5 bar. More preferably, the pressure applied is from about 0.7 bar to about 1.5 bar.

In one embodiment, at least one of the substrate 112 and/or second adhesive film 108 may be heated prior to the contacting step 137. In yet another embodiment, the contacting step 137 may be preformed prior to applying one or both of heat and pressure. In still yet another embodiment, second adhesive film 108 may be heated and contacted with the substrate prior to the application of pressure.

In another embodiment, the second adhesive film 108 of the self-supporting, elastomeric adhesive layer 105 is contacted and/or adhered to the substrate 112 prior to the contacting of first fiber ends 103 with the first adhesive film 106. The optional second carrier sheet 121 may be adhered to the first adhesive film 106 during the contacting of the second adhesive film 108 with the substrate 121. It can be appreciated that, the optional second carrier sheet 121 is removed prior to the contacting of the first fiber ends 103 with the first adhesive film 106.

Step 132 may optionally include a sublimation printing process. In another configuration the sublimation printing step may be conducted prior to or after the applying of heat and/or pressure step 138.

In an optional embodiment of the present invention flock fibers 102 embedded by an electrostatic deposition process after contacting the self-supporting, adhesive layer 105 is contacted with the substrate 112. The self-supporting, adhesive layer 105 may be adhered to the substrate 112 by the application of one or both heat and pressure prior to the electrostatic deposition of the flock fibers 102.

FIGS. 7-10 depict a first flocking system 150 for manufacturing the flocked product 109 according to an embodiment of the present invention. The first flocking system 150 includes a first roll 151 containing the self-supporting, elastomeric adhesive layer 105 and an optional second roll 152 containing the optional second carrier film 121. As can be appreciated, the optional second roll 152 containing the optional second carrier film 121 is omitted in certain applications. In one configuration the self-supporting, elastomeric adhesive layer 105 contains the second carrier film 121. In another configuration, the self-supporting, elastomeric adhesive layer 105 and/or second carrier film 121 are contacted one on top of the other to form a composite adhesive film 159 on a continuous running web line 153.

The composite adhesive film 159 is subjected to a flocking process in a flocking device 154 to form a flocked film 155. In a preferred embodiment, the flocking device 154 is an electrostatic flocking device. In the electrostatic process, different colors of flock (or fibers) are typically applied through separate screens or a single color flock is applied and later sublimation printed to form the multi-colored design. In multi-color flocking, the screens have a distribution of openings consistent with the desired locations of the respective colors of flock fibers. Other techniques in which the flock is mounted in a desired position and in such a way as to hold or entrap the flock after curing, may also be employed in either the direct or transfer flocking process configurations. Such techniques include vibration, gravity, and spraying of the flock onto the self-supporting, elastomeric adhesive layer 105.

Figure 7:
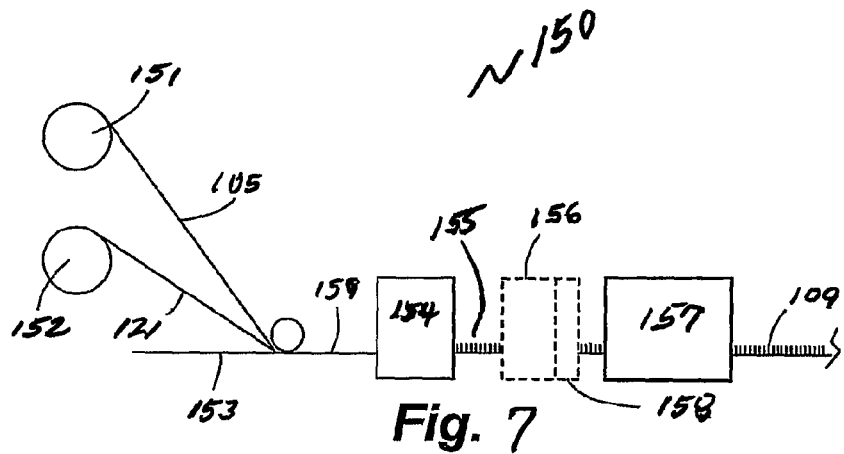
FIG. 7 shows a process configuration according to an embodiment of the present invention.

Cutting 156 and weeding 158 devices are located between the flocking device 154 and heating and/or pressurizing device 157 in the first flocking system 150 depicted in FIG. 7. The cutting device 156 cuts a flocked surface into desired shapes as discussed below while the weeding device 158 peels off or removes unwanted portions of the flocked surface before applying heat and/or pressure. The cutting device 156 may be any suitable cutting device known to a person of ordinary skill within the art, such as a steel-rule die, hard tool metal die, laser cutter, ultrasound cutter, high frequency cutter, hot-wire cutter, or water jet cutter.

In one alternative embodiment, the self-supporting, elastomeric adhesive layer 105 and the second carrier film 121 are cut before flocking occurs. In other words, the cutting 156 and weeding 158 devices are positioned between the first 151 and second 152 rolls and the flocking device 154 so that cutting and weeding occurs before the flock is in (intimate) contact with the self-supporting, elastomeric adhesive layer 105. The flocked film 155 is next treated by the heating and/or pressurizing device 157 (such as a lamination machine) to produce the flocked product 109. The heating device heats the self-supporting, elastomeric adhesive layer 105 to a temperature above the softening point of the first adhesive film 106 (the film layer the flock fibers are in contact with) while the pressurizing device applies pressure to the flock fibers 102 to embed the first fiber ends 103 (the flock fiber ends in contact with the first adhesive film 106) into the softened first adhesive film 106. As can be seen from FIG. 10, the flocked product 109 has the flock fibers 102 extending into the self-supporting, elastomeric adhesive layer 105 and passing into the first adhesive film 106 of the self-supporting, elastomeric adhesive layer 105. The softening and pressuring operations also cause the second adhesive film 108 of the self-supporting, elastomeric adhesive layer 105 to adhere to the carrier sheet 121.

Figure 11:
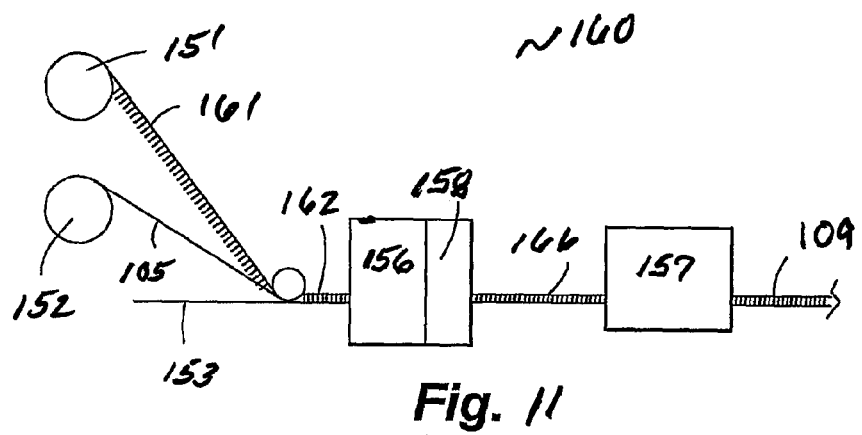
FIG. 11 shows another process configuration according to another embodiment of the present invention.
Figure 12:
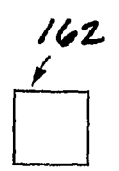
FIG. 12 is a plan view of a composite film made according to the process configuration of FIG. 11.
Figure 13:
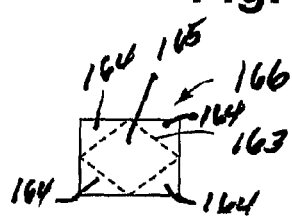
FIG. 13 is a plan view of a composite film made according to the process configuration of FIG. 11.
Figure 8:
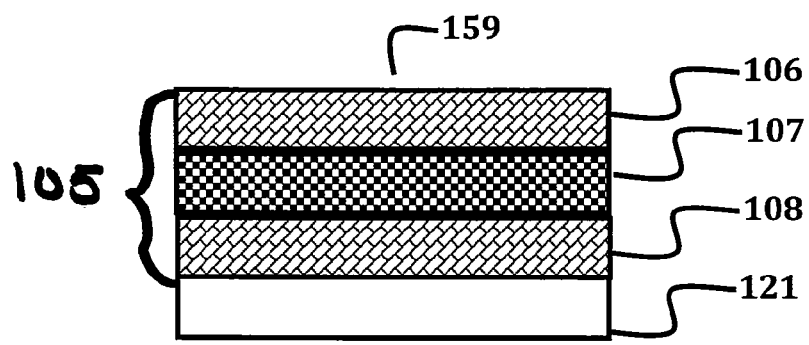
FIG. 8 is a cross-sectional view of contacted films made according to the process configuration of FIG. 7.
Figure 9:
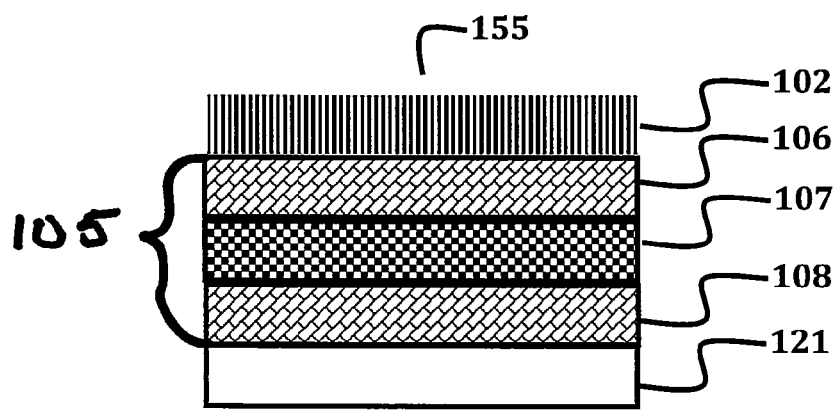
FIG. 9 is a cross-sectional view of a flocked film made according to the process configuration of FIG. 7.
Figure 10:
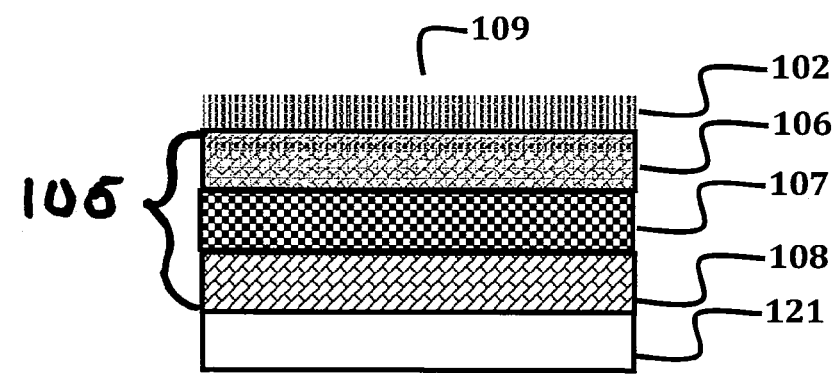
FIG. 10 is a cross-sectional view of a product made according to the process configuration of FIG. 7.

FIGS. 11-13 depict another embodiment of the present invention for manufacturing the flocked product 109. A second flocking system 160 for making the flocked product 109 will now be discussed with reference to FIGS. 11-13.

As in the first flocking system 150, the second flocking system 160 includes the first 151 and second 152 rolls. The first roll 151 contains a flocked transfer sheet 161 and the second roll 152 the self-supporting, elastomeric adhesive layer 105. The flocked transfer sheet 161 includes flock fibers 102 adhered to the first carrier sheet 100 by the release adhesive 101. The first flock fiber ends 103 comprise the free flock fiber ends of the flocked transfer sheet 161. As can be appreciated, the second flock fiber ends 104 are in contact with the release adhesive 101. The self-supporting, elastomeric adhesive layer 105 may or may not contain the second carrier sheet 121.

The self-supporting, elastomeric adhesive layer 105 and flocked transfer 161 are contacted one on top of the other to form a flocked composite film 162. In the composite film 162, the self-supporting, elastomeric adhesive layer 105 is generally not adhered to and/or bonded to the first flock fiber ends 103.

The flocked composite film 162 is subjected to cutting in a suitable cutting device 156 to form a cut, composite flocked film 166. The flocked composite film 162 (including both the flocked transfer 161 and self-supporting, elastomeric adhesive layer 105) is cut into desired shapes 165, such as a diamond shape represented by cut lines 163 in FIG. 13. The cutting takes place while the flock is still mounted on the first carrier sheet 100. For laser cutting, the laser may be configured to cut to a precise depth or kiss cut so that it will not cut the web line 153.

The weeding device 158 next weeds the cut composite flocked film 166 to form cut and weeded flocked composite film 167. Unwanted portions 164 located exteriorly of the desired shapes 165 or cut lines 163, are removed prior the heating and/or pressurizing device 157. In other words, the desired shapes 165, but not the unwanted, exteriorly unwanted portions 164, remain on the web line 153 for input into the heating and/or pressurizing device 157.

The cut and weeded composite flocked film 167 is next heated and pressurized in the heating and/or pressurizing device 157 to form the flocked product 109.

Figure 14:
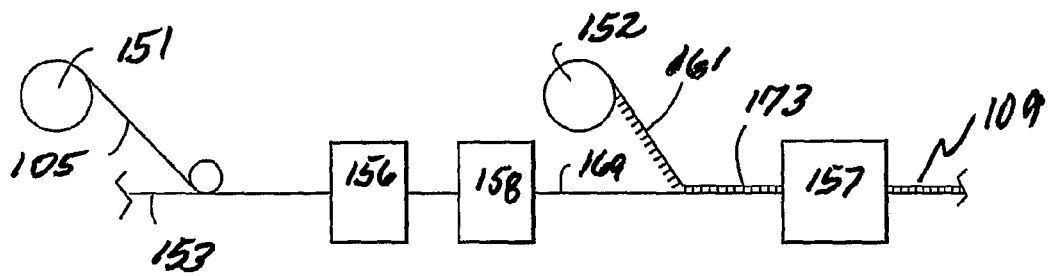
FIG. 14 shows yet another process configuration according to yet another embodiment of the present invention.

FIG. 14 depicts a third system 168 to yet another embodiment of the present invention for making the flocked product 109. The process includes a first roll 151 of the self-supporting, elastomeric adhesive layer 105, which is fed onto a continuous web line 153. The self-supporting, elastomeric adhesive layer 105 is cut into desired shapes by the cutting device 156 and the unwanted portions removed from the web line 153 by the weeding device 158 to form a cut and weeded self-supporting, elastomeric adhesive layer 169.

Figure 15:
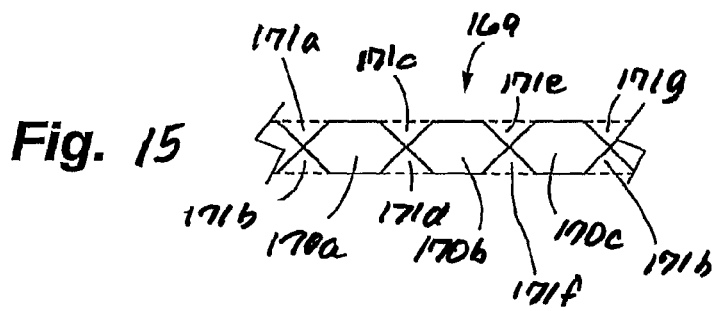
FIG. 15 is a plan view of a cut adhesive film made according to the process configuration of FIG. 14.

FIG. 15 depicts the cut and weeded self-supporting, elastomeric adhesive layer 169. The cut and weeded self-supporting, elastomeric adhesive layer 169 includes a plurality of identically shaped repeating adhesive layer segments 170a-170c and unwanted adhesive layer segments 171a-171h (the areas bounded by the dashed lines and peripheral lines of the adhesive layer segments) positioned between the adjacent segments have been removed by the weeding device 158.

Figure 16:
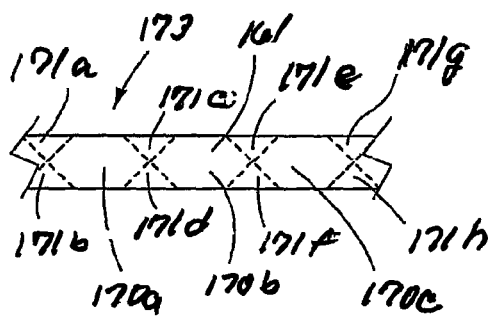
FIG. 16 is a plan view of a flock transfer positioned on top of the cut adhesive film of FIG. 15.

The cut and weeded self-supporting, elastomeric adhesive layer 169 is next contacted with the flocked transfer sheet 161 to form another flocked composite film 173. FIG. 16 shows the flocked transfer sheet 161 positioned on top of the adhesive layer segments 170a-170c (shown by dashed lines). As will be appreciated, the portions of the flocked transfer sheet 161 above weeded out segments 171a-171h having no adhesive to adhere to. Thus, after the heating and/or pressurizing device 157 removal of the first carrier sheet 100 removes the flock fibers 102 in these areas as well (because the flock fibers 102 stay attached to the carrier sheet).

As can be seen in FIG. 16, the various adhesive layer segments 170a-170c are interconnected by a thin part of continuous material peripherally running down the center of the material and the cut scrap material or weeded out segments 171a-171h may be interconnected by a thin part of continuous scrap material along at least one side of the portion of the cut material web to be discarded. In this way, a rewind mechanism can be used in the line (also called take-up reel) and when production begins the finished product and/or scrap material may be attached to the rewind wheel. The wheel or roll collects the material. In the case of weeding unwanted scrap material, the wheel or roll automatically removes the scrap material from the web before the scrap material is contacted with the flock fibers.

Figure 17:
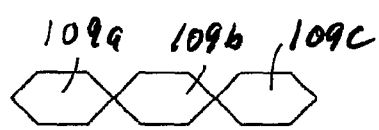
FIG. 17 is a plan view of a laminated film product made according to the process configuration of FIG. 14.
Figure 18:
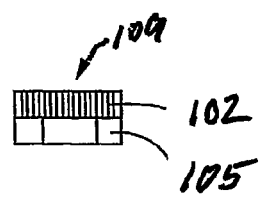
FIG. 18 is a cross-sectional view of a laminated film product made according to the process configuration of FIG. 14.

A laminator 171 causes the cut and weeded self-supporting, elastomeric adhesive layer 169 to adhere to the overlying flock fibers 102 in the transfer sheet 161 to form after the applying of heat and/or pressure the flocked product 109. Removal of the carrier sheet produces a plurality of flocked articles 109a-109c as shown in FIGS. 17 and 18. Each flocked product 109 includes a plurality of flock fibers 102 adhered to an underlying self-supporting, elastomeric adhesive layer 105.

The process of this embodiment is commonly preferred. The film combination may be quickly, precisely, and cleanly cut and weeded before being combined to flock-with-release-adhesive on another carrier substrate. During heat lamination and activation of adhesive films and/or layers, for example, flock will only transfer where it is in contact with the precut adhesive film and/or layer, and the peripheral flock fibers can do a nicer job of covering the edges than is possible with application of flock fibers before cutting of the adhesive film and/or layer is performed. In the latter case, "raw" cut edges can be seen and sometimes have a white adhesive appearance visible from the side that looks unfinished and therefore of lower perceived value to consumers.

In the embodiment of FIGS. 11 and 14, the release adhesive 101 may be selectively applied to the first carrier sheet 100 only in locations where flock fibers 102 are needed (such as in the areas of the transfer sheet 161 in contact with the adhesive layer segments 170a-170c), leaving the rest of the first carrier sheet 100 blank or free of release adhesive (such as in the areas of the transfer sheet 161 adjacent to the weeded out segments 171a-171h). In this manner, the flock fibers 102 will be applied only to the sections of the first carrier sheet 100 contacting the release adhesive 101 with no flock fibers 102 being located in the sections of the first carrier sheet 100 which are free of the release adhesive 101. The flock is thus applied only where needed, thereby saving material. As will be appreciated, the release adhesive 101 is generally applied to those sections of the first carrier sheet 100 overlying the adhesive layer segments 170a-170c. In one configuration, the release adhesive 101 is applied not only over the area of the first carrier sheet 100 in contact with the adhesive layer segments 170a-170c but also outside this area to avoid quality problems resulting from improper registration of the flocked area of the first carrier sheet 100 and the adhesive layer segments 170a-170c.

In another embodiment, the performing of cutting before laminating is done in a process in which (a) a hotmelt film is contacted with a carrier, (b) the film is coated with adhesive and flock to form a flocked article, and finally (c) the flocked article cold laminated to a pressure sensitive adhesive to form a "sticker" on a carrier. Cutting is performed after step (a) and before steps (b) and (c).

A number of variations and modifications of the invention can be used. It would be possible to provide for some features of the invention without providing others. For example in one alternative embodiment, the process of the second embodiment is not limited to transfers. As will be appreciated, instead of a transfer sheet 161 the process may be used with direct flocking. In that event and with reference to FIG. 11, the laser cutting device 156 is positioned between the flocking device 154 and the heating/pressurizing device 157. In another alternative embodiment, the positions of the first 151 and second 152 rolls are reversed such that the first carrier sheet 100 is positioned on the bottom (in contact with the web line 153) and the self-supporting, elastomeric adhesive 154 on top. In other words, the flocked composite film 162 is flipped upside with the first carrier sheet 100 on the top. Having the first carrier sheet 100 on top can provide for cleaner cuts and prevent cutting of the web line 153 by the cutting device 156.

In another configuration, the flocked transfer sheet 161 may be precut and weeded using different cutting and weeding devices and located on top of the corresponding cut and weeded self-supporting, elastomeric adhesive layer 169 before lamination occurs. As will be appreciated, when a multicolor flocked design on the transfer sheet 161 is being laminated to a pre-cut film and/or it may be contacted in register. In other words, the cut film and/or is aligned using known techniques with the corresponding flocked design.

Figure 19:
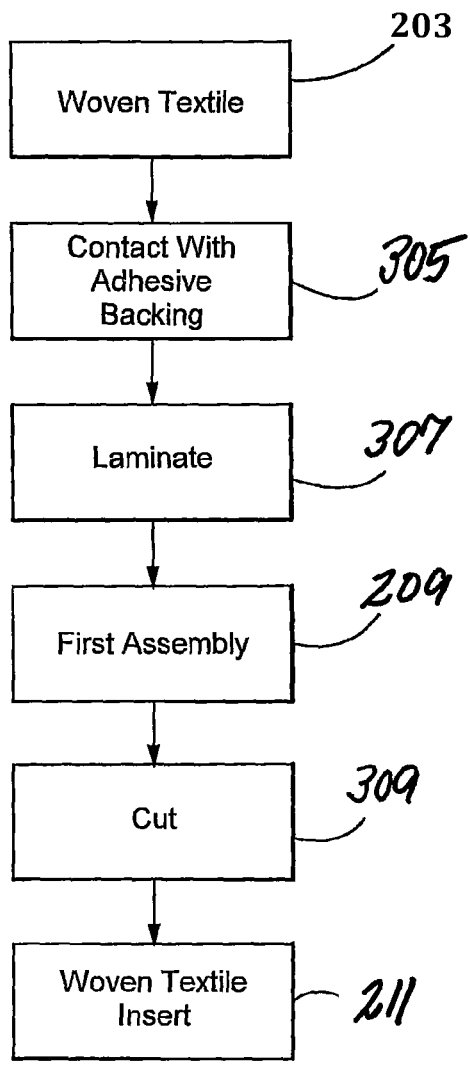
FIG. 19 depicts a process for making a textile product according to an embodiment of the present invention.
Figure 20:
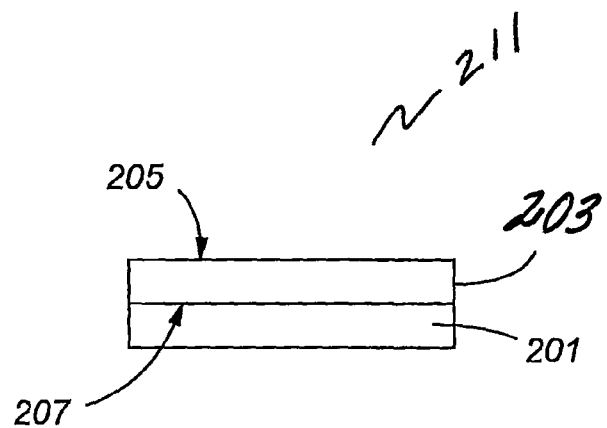
FIG. 20 is a cross-sectional view of view of a textile product according to the process depicted in FIG. 19.
Figure 21:
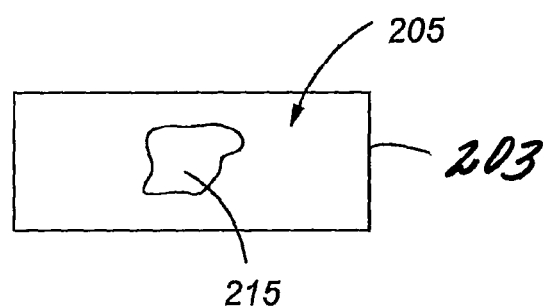
FIG. 21 is a plane view of a textile product according to the process depicted in FIG. 19.

FIG. 19 depicts a method of preparing a woven textile product 211 (FIGS. 20 and 21). In step 305, an elastomeric adhesive backing 201 is contacted with the woven textile 203. In a preferred embodiment, the elastomeric adhesive backing 201 comprises the self-supporting, elastomeric layer 105. Preferably, the woven textile 203 comprises a stretchable and/or elastomeric textile. The woven textile 203 may comprise one or more of a stretchable and/or elastomeric polymer, fiber, weave or combination thereof. Preferably, the weave comprises a stretchable and/or elastomeric weave.

Preferably, the woven textile 203 contains a graphic design image 215. More preferably, the graphic design image 215 is one of woven into the weave and/or printed on woven textile 203.

Non-limiting examples of a weaving process suitable for generating the graphic design image 215 within the weave of woven textile 203 are, without limitation: jacquard; brocade; bedford, damask; wandering weft; leno; needle or bobbin lace; embroidered, looped or knotted netting; open-work embroidery, knitting, macramé; sprang; wrap- or weft-faced; brocatelle; and slit, dovetailed, interlocking or eccentric tapestry weaves. In general, the preferred weaving process for producing the graphic design image 215 within the weave raises each warp (or weft) thread independent of the others and/or introduces a supplementary (or filler) yarn. Woven graphic design inserts and methods for making the same are discussed in U.S. patent application Ser. No. 12/397,946 with a filing date of Mar. 4, 2009, which is incorporated in its entirety herein by this reference.

Weaving the graphic design image 215 into the woven textile 203 using dyed yarns eliminates the need to print the graphic design image 215 on the textile, reducing and/or eliminating a step of printing an image on the textile.

Additionally, having a graphic design image 215 within the weave of the woven textile 203 creates a unique artistic element to the woven graphic design image 215. The artistic quality and beauty of the woven graphic design image 215 generally surpasses the artistic quality and beauty of a similarly printed image. In can be appreciated that, the graphic design image 215, may be woven in a single hue, value of a single hue, or differing hues and/or values.

The woven textile 203 has first 205 and second 207 opposing textile surfaces. In one embodiment, the graphic design image 215 is at least contained within the weave of the first textile surface 205. In another embodiment, the design image is printed, such as by sublimation printing techniques, onto the woven textile 203. The elastomeric adhesive backing 201 is positioned adjacent to the second textile surface 207. Preferably, the elastomeric adhesive backing 201 is adhered to the second textile surface 207 by the first adhesive film 106.

In step 307, the elastomeric adhesive backing 201 is laminated to the woven textile 203 to form a first textile assembly 209, thereby securing the woven textile 203 to the elastomeric adhesive backing 201. Heat and/or pressure are applied during the laminating process. The applied heat is sufficient to adhesively bond the woven textile 203 to the elastomeric adhesive backing 201. That is, when the elastomeric adhesive backing comprises the self-supporting, elastomeric adhesive layer 105, the applied heat is sufficient to adhesively bond the woven textile 203 to the first adhesive film 106 of the self-supporting, elastomeric adhesive layer 105. Moreover, the applied heat at least softens and/or partially melts the first adhesive film 106, or the elastomeric adhesive backing 201, to adhere the woven textile 203 to the self-supporting, elastomeric adhesive layer 105, or the elastomeric adhesive backing 201. The temperature required to soften the first adhesive film 106 depends on the chemical properties of the adhesive. The pressure is at least sufficient to substantially mechanically interlock the elastomeric adhesive backing 201 with the woven textile 203, more specifically to at least sufficiently mechanically interlock the first adhesive film 106 with the woven textile 203.

In one embodiment, the elastomeric adhesive backing 201 is laminated to a woven web 221 to form a laminated web 220. The elastomeric adhesive backing 201 is contacted with the woven web 221 before individual design images 215 are cut from the woven web 221.

The elastomeric adhesive backing 201 adds stability to the first textile assembly 205 and keeps the first textile assembly 205 substantially flat and substantially dimensionally stable. Without the elastomeric adhesive backing 201, the woven textile 203 substantially lacks sufficient stability and is difficult to keep flat to align the graphic design image 215 in registration for further processing, such as, cutting for an use as an insert and/or appliqué. Manually aligning a textile lacking sufficient dimensional stability is difficult, consumes time, and adds cost. The elastomeric adhesive backing adhesive 201 provides sufficient stability and/or rigidity to the first textile assembly 205, such that the first textile assembly 205 can to be aligned by a machine for further processing, such as, cutting for an insert and/or appliqué. The woven textile 203 without the elastomeric adhesive backing adhesive 201 substantially lacks stability for machine alignment. Additionally, the elastomeric adhesive backing 201 maintains the woven textile 203 in a substantially flat, wrinkle-free condition after the woven textile 203 is laundered.

An important aspect to consider is the thermally induced shrinkage of the woven textile 203. Normally, the woven textile 203 thermally shrinks, with the amount of shrinkage depending upon the length of time the woven textile 203 is maintained at a given temperature. At least two techniques can be used singly or collectively to compensate for thermal shrinkage. In one technique, the woven textile 203 is heated to at least the maximum temperature to be experienced during lamination, and, optionally, in later processing steps. The woven textile 203 is held at the selected temperature for a time sufficient for the woven material to thermally shrink. The heat is then removed, and the woven textile 203 cools. During cooling, the woven textile 203 weave relaxes. The thermally shrunk woven textile 203 is then subjected to the lamination process of applying the elastomeric adhesive backing 201 thereto. The woven textile 203 may shrink by as much as 20% or more, depending on the applied temperature and the yarn composition and/or weave. In another technique, the pressure applied to the woven texture 103 during lamination is sufficiently high to inhibit substantially textile shrinkage. Preferably, the pressure applied during the lamination is at least about 10 psi, more preferably at least about 12 psi, and even more preferably ranges from about 12 to about 50 psi. Stated another way, the pressure applied by the platen to the woven textile 203 is preferably at least about 1 psi and even more preferably at least about 1.4 psi. Under these pressures, the dimensions of the woven textile 203 commonly shrink no more than about 5% and even more commonly no more than about 2.5%. After lamination, the elastomeric adhesive backing 201 maintains substantially the dimensions of the woven textile 203 and design image 215.

In step 309, the first textile assembly 205 is cut to form a woven textile product 211. In one configuration, the first textile assembly 205 is cut in registration with the graphic design image 215. The cutting process may be any cutting process as discussed above. Preferably, the cutting process is one of laser or die cutting process. The cutting process may also include an ablation process to improve adhesion of the woven textile 203 in subsequent processing. Particularly preferred laser cutting and/or ablation processes are disclosed in U.S. application Ser. No. 11/874,146 to Abrams which is incorporated in its entirety herein by this reference.

Laser cutting is preferred. Laser cutting seals and/or fuses the edges, extending the useful area of the woven textile product 211 to include the sealed and/or fused edges. In other words, the laser cutting fuses the yarns comprising the cut-edges of woven textile product 211. The fused-edge yarns do not "pop-up" or fray, as do die-cut yarn edges. Die-cut edges typically have long loose yarns, such as "float" yarns on the surface which "pop up" and are easily and quickly frayed. The fused-edge yarns stay-in place, are more durable and more highly valued by consumers. It can be appreciated that, for some applications and designs frayed edges are preferred, such as, designs that have a worn, more casual, and/or more vogue appearance. The fused-edges of the woven textile product 211 also allow higher processing line speeds. While not wanting to be bound by any theory, one or more fused-edge yarns and the adhesive melt during the laser cutting to form the fused edge. Typically, the appearance of the cut fused-edge has a "beaded-like" appearance. The laser power and speed of the cutting process commonly affect the degree that cut-edge yarns are fused. For example, low laser power and/or fast cutting speed decrease the degree to which the cut-edge is fused. Optimal fused-edges typically require a balancing of the laser power and line speed to properly fuse most, if not all, of the edge yarns and minimize, or eliminate, "pop-up" or frayed edge yarns.

In one implementation, cutting is performed by a cutting machine having an optical element to identify a selected reference point in each design image. The reference point may be identified optically, for example, using reflected laser light in a conventional laser light registration system, as known by those of skill in the art. Optical registration is preferred over using a guide side of the cut out insert (or a prior cut line) because woven materials lack sufficient dimensionality to use an edge for registration. Once the desired reference point is identified, the cutting element cuts out the design image using programmed logic to impart accurate registration and to precisely cut out the design image 215. In this manner, the design image 215 is cut to the desired size and shape. Also, the design elements of the design image 215 are registered relative to the cut lines. It can be appreciated that, one of the artistic design elements is the relationship of the cut lines with the design image 215.

Figure 22:
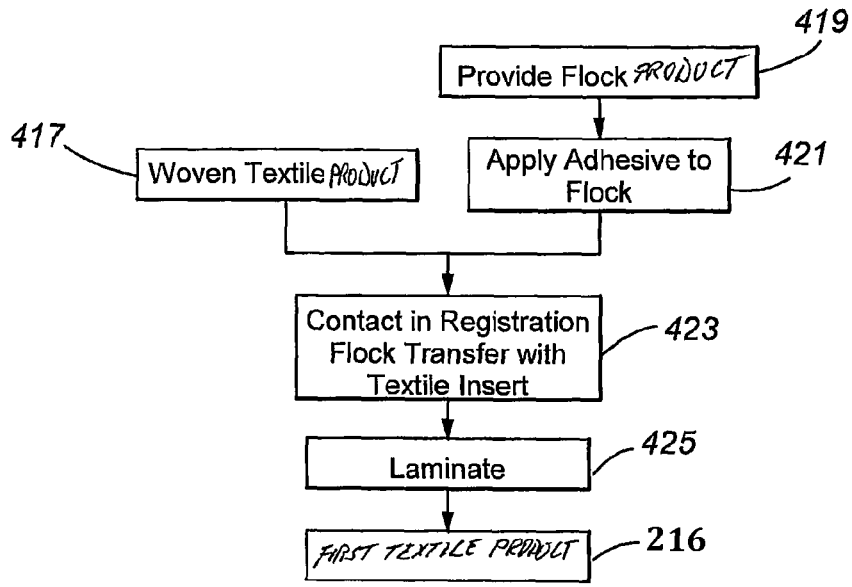
FIG. 22 depicts a process for making a textile article according to the process depicted in FIG. 19.

FIG. 22 depicts a process for adhering flock fibers 102 to the woven textile product 211 to form the articles depicted in FIGS. 23A-23C.

In step 419, a flocked transfer sheet 161 having a void 210 is supplied. The flocked transfer sheet 161 comprises a plurality of flock fibers 102 adhered to a first carrier sheet 100 by a release adhesive 101. The flock fibers 102 have opposing first 103 and second 104 fiber ends. The first fiber ends are adhered to the first carrier sheet 100 by release adhesive 101.

In step 421, an elastomeric adhesive 230 is applied to at least most of the second fiber ends 104 to form flocked product 109. In a preferred embodiment, the elastomeric adhesive 230 comprises the self-supporting, elastomeric adhesive layer 105.

In another preferred embodiment, the flocked product 109 (of FIG. 1 and of any of the previously described process 114 and/or 122) is provided in step 419. That is, step 421 may be omitted when the flocked product 109 of FIG. 1 is provided in step 419.

The elastomeric adhesive 230 may be any adhesive, preferably, a thermosetting adhesive, a thermoplastic adhesive, or a combination thereof. The adhesive may be a liquid, powder, web, or solid adhesive. When the elastomeric adhesive 230 is a liquid, it may be sprayed, wet coated, or screen-printed on the free ends of the flock fibers 102. And, when the elastomeric adhesive 230 is a solid, it may be one of a powder, web, or dry self-supporting film, such as a continuous extruded film.

Preferably, the elastomeric adhesive 230 comprises a thermoplastic adhesive. Suitable thermoplastic adhesives comprise homopolymers, copolymers or polymer alloy comprising one or more of polyolefins, polystyrenes, polyvinyls, polyacrylics, polyhalo-olefins, polydienes, polyoxides, polyesters, polyacetals, polysulfides, polythioesters, polyamides, polythioamides, polyurethanes, polythiourethanes, polyureas, polythioureas, polyimides, polythioimides, polyanhydrides, polythianhydrides, polycarbonates, polythiocarbonates, polyimines, polysiloxanes, polysilanes, polyphosphazenes, polyketones, polythioketones, polysulfones, polysulfoxides, polysulfonates, polysulfoamides, polyphylenes, and combinations and/or mixtures thereof. More specifically in a preferred embodiment, the thermoplastic composition comprises one of acrylonitrile butadiene styrene, acrylic (PMMA), celluloid, cellulose acetate, cycloolefin copolymer, ethylene-vinyl acetate (EVA), ethylene vinyl alcohol (EVOH), fluoroplastic (PTFE, FEP, PFA, CTFE, ECTFE, and/or ETFE), ionomer, liquid crystal polymer (LCP), polyacetal (POM and/or acetal), polyacrylate (acrylic), polyacrylonitrile (PAN or acrylonitrile), polyamide (PA or nylon), polyamide-imide (PAI), polyaryletherketone (PAEK and/or ketone), polybutadiene (PBD), polybutylene (PB), polybutylene terphthalate (PBT), polycaprolactone (PCL), polychlorotrifluoroethylene (PCTFE), polyethylene terephthalate (PET), polycycloheylene dimethylene terephthalate (PCT), polycargonate (PC), polyhydroxylalkanoate (PHA), polyketone (PK), polyester, polyethylene (PE), polyetherketoneketone (PEKK), polyetherimide (PEI), polyethersulfone (PES), polysulfone, polyethlenechloriate (PEC), polyimide, polyacetic acid (PLA), polymethylpentene (PMP), polyphenylene oxide (PPO), polyphylene sulfide (PPS), polyphthalamide (PPA), polypropylen (PP), polystyrene (PS), polsulfone (PSU), polytrimethylen terphthalate (PTT), polyurethane (PU), polyvinyl acetate (PVA), polyvinyl chloride (PVC), polyvinylidene chloride (PVDC), styrene-acrylonitriel (SAN), and combinations thereof. In an even more preferred embodiment, the elastomeric adhesive 230 comprises one or more of polyurethane, polyvinyl acetate, polyamide, polyacrylate and combinations thereof. In a more preferred embodiment, the elastomeric adhesive 230 comprises a polyurethane.

In step 423, the flocked product 109 and the woven textile product 211 (supplied in step 417) are contacted in registration. That is, one of the self-supporting, elastomeric adhesive layer 105 and elastomeric adhesive 230 is contacted with registration area 213 of the woven textile product 211 (FIG. 23A). Additionally, the void 210 is in registration with at least most, if not all, of the graphic design image 215 of the woven textile product 211.

It is appreciated that the void 210, woven textile product 211 or both are configured and/or sized, such that the woven textile product 211 and void 210 substantially match to properly display the woven textile product 211 when placed adjacent to the void 210. It can be further appreciated that, in one configuration, the void 210 and/or the graphic design image 215 substantially match in size and shape to properly display the woven textile product 211 and/or graphic image 215 when placed adjacent to the void 210. In another configuration, the graphic design image 215 or insert 211 is slightly larger than the void 210. In this configuration, the width and height dimensions of the design image 215 are preferably at least about 2 mm, and even more preferably at least about 4 mm larger than the same respective dimensions of the void.

Preferably, the registration area 213 has been prepared to accept one of the adhesives 105 or 230. Prepared to accept one of the adhesives 105 and 230 means at least some, if not most, of the registration area 213 has be treated to substantially promote and/or enhance adhesive bonding of the woven textile product 211 with one of the self-supporting, elastomeric adhesive 105 and elastomeric 230 being contacted with the woven textile product 211. In one configuration, the woven textile product 211 may be ablated, mechanically, chemically, or thermally treated to improve adhesive bonding. While not wanting to be limited by example, the registration area 213 has been prepared by forming a plurality of holes 214 within the registration area 213.

In step 425, the elastomeric adhesive 230 is thermally bonded to the woven textile product 211 to form a first textile product 216 (FIG. 23B). During the lamination step 425, the elastomeric adhesive 230 is softened and/or partly liquefied and under the application of heat and pressure flows into the plurality of holes 214 filing the plurality of holes with the elastomeric adhesive 230 (shown in FIG. 23B as 217). It can be appreciated that, the woven textile 203 may be removed in selected areas of the contact area 629. While not wanting to be bound by any theory, it is believed that the elastomeric adhesive 230 within the plurality of holes 214 substantially adhesively bonds with the woven textile product 211 by one or more of: mechanical, electrostatic, adsorption, chemisorption, diffusion, or a combination thereof. Preferably, the adhesive interaction of the elastomeric adhesive 230 with the woven textile product 211 is at least some, if not mostly, mechanical in nature.

The carrier sheet 100 with release adhesive 101 may be removed from the first textile product 216 to form a second textile product 219. In one configuration, the elastomeric adhesive 230 holding the transfer to the adjacent face of the insert 417 (FIGS. 23A-23C) provides a substantially satisfactory bond (at least about 10 pounds measured by a lab peel test), primarily by securing a mechanical grip on the insert's surface.

Figure 24:
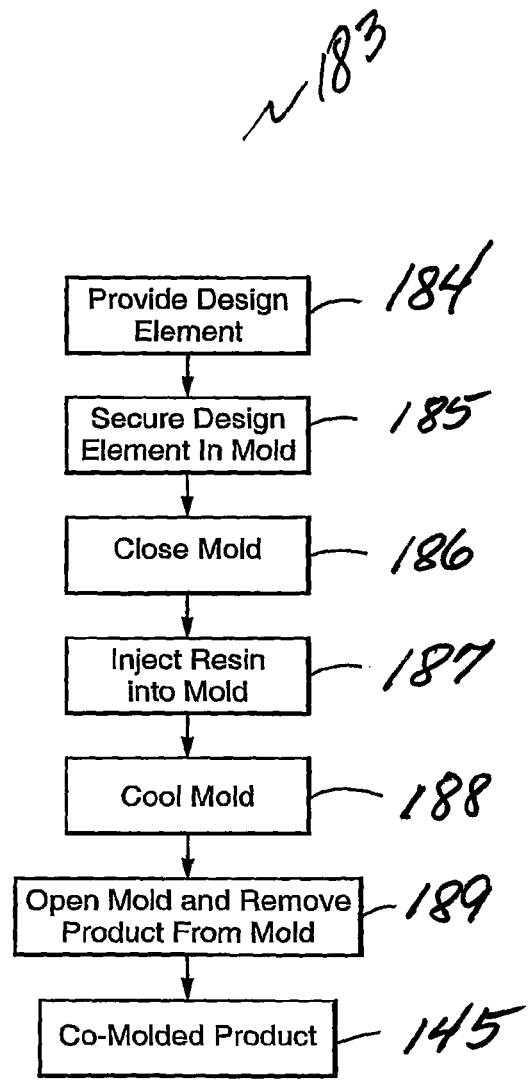
FIG. 24 depicts a molding process for making a molded product according to an embodiment of the present invention.
Figure 25:
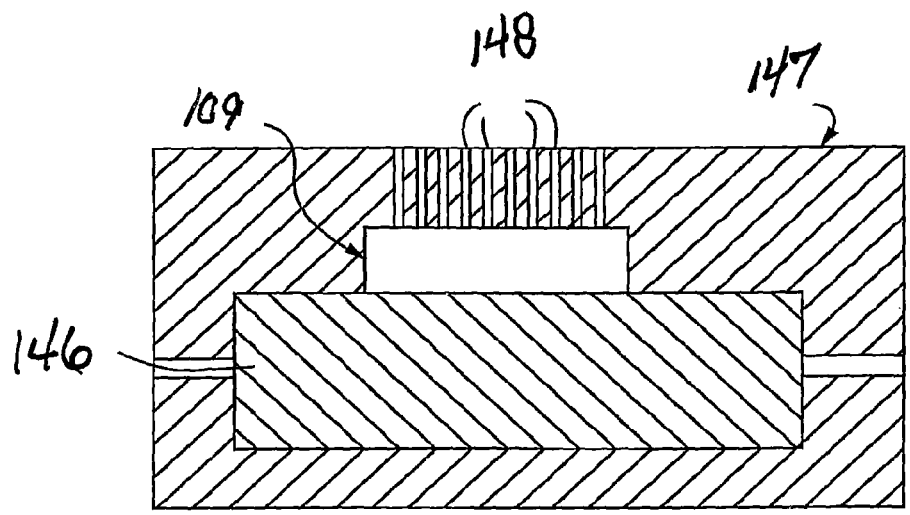
FIG. 25 is a cross-sectional view of a mold and molded product according to the process depicted in FIG. 24.

Another aspect of the present invention is depicted in FIGS. 24, 25, 26 and 27. FIG. 24 depicts a process 183 for a co-molded product 145 having flocked product 109. The flocked product 109 is provided for in step 184 and mounted in a mold 147 in step 185. It can be appreciated that the textile product 211 or a combination of the textile 211 and flocked 109 products can be provided and mount in the mold 147 in step 185. FIG. 25 depicts a configuration where the flocked product 109 is on top of molded article 146. In another configuration, depicted in FIG. 26, the flocked product 109 is embedded in the molded article 146. The flocked product 109 may be cut and/or fabricated to fit within the mold 147. In one configuration, the flocked product 109 has an optional backing material 149.

The flocked product 109 is secured in step 185 within the mold 147 by any means, such as, but not limited to, a temporary or release adhesive, or by the use of a vacuum. The mold 147 is depicted with vacuum holes 148 passing through the mold body, the vacuum holes 148 are in contact with the flocked product 109. A vacuum may be drawn through the vacuum holes 148 to hold the flocked product 109 in place within the mold 147.

In another configuration, a low-pressure resin injection may be used secure the flocked product 109 in position; after securing the flocked product 109, a second full-pressure injection is made.

Figure 26:
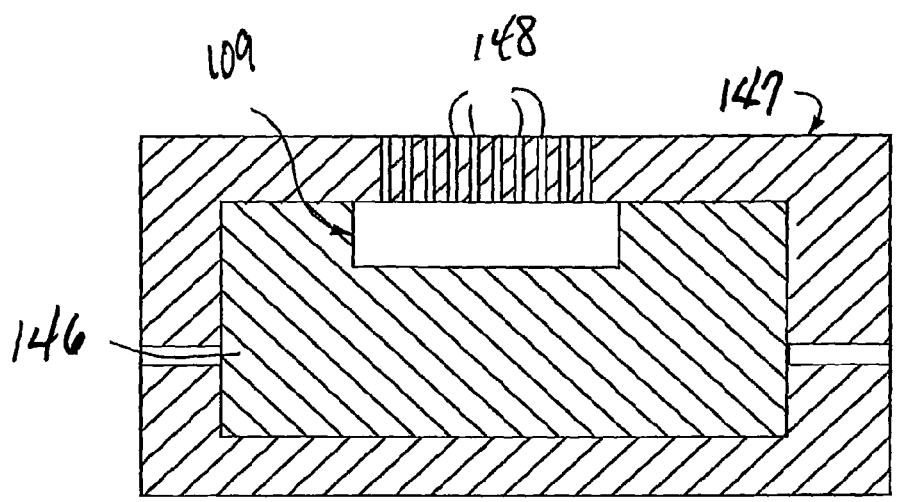
FIG. 26 is a cross-sectional view of another mold and molded product according to the process depicted in FIG. 24.

In another configuration, a the mold 147 cavity may have a slight depression (of about 1 mm) to accommodate the flocked product 109, such that, the flocked product 109 is substantially flush with a surface of the molded article 146, as shown in FIG. 26.

After securing the flocked product 109 in the mold 147, the mold 147 is closed in step 186 and a hot resin is injected into the mold 147 in step 187. The method of molding may be any molding method, such as, but not limited to, injection, reaction injection, compression, transfer, and resin transfer molding. In a particularly preferred embodiment, the method of molding is reaction injection molding, wherein two base resins are mixed together as they enter the mold 147, a chemical reaction occurs within the mold 147 to form the molded article 146. Preferably, the molded article 146 comprises an elastomeric, bendable, and/or stretchable molded article. That is, the molded article 146 substantially has elastic properties (as defined above).

In step 188, the mold 147 is cooled, after injecting the resin into the mold 147. The mold 147 may be cooled by any appropriate method known within the art. One preferred method for cooling is circulating water, either around the exterior or through the walls of the mold 147. The water may be circulated during or after the injection molding process.

As the resin cools, the resin permanently bonds with the flocked product 109 to form the co-molded product 145. When the resin has sufficiently cooled and/or solidified the mold 147 is opened and the co-molded product 145 is removed, in step 189, from the mold 147. In instances where the flocked product 109 the first carrier sheet 100 and associated release adhesive 101 are removed from the co-molded product 145.

Figure 27:
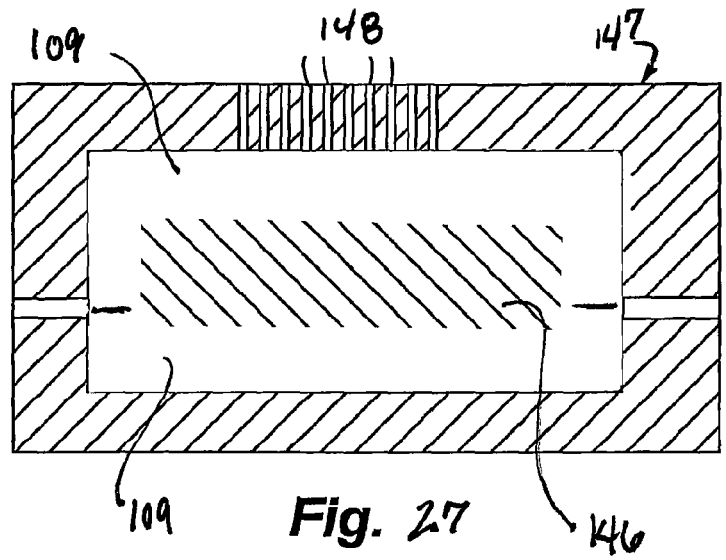
FIG. 27 is a cross-sectional view of yet another mold and molded product according to the process depicted in FIG. 24.

FIG. 27 depicts another mold 147 which may be used in the process depicted in 24 for forming a co-molded product 145. The flocked product 109 is secured in step 185 around one of the entire perimeter and/or volume of the mold 147 by any means, such as, but not limited to, a temporary or release adhesive, or by the use of a vacuum. The mold 147 is depicted with vacuum holes 148 passing through the mold body, the vacuum holes 148 are in contact with the flocked product 109. A vacuum may be drawn through the vacuum holes 148 to hold the flocked product 109 in place within the mold 147. It can be appreciated that the mold need not have the vacuum holes 148, since the flocked product 109 can be secured in mold by other methods, such as a release adhesive.

In one configuration, after securing the flocked product 109 in the mold 147, a substantially pre-formed elastomeric article may be placed in the mold 147 and contacted with at least some of the flocked product 109 secured in the mold. The mold 147 is closed in step 186 and one or both of heat and pressure are applied to adhesively bond the flocked product 109 to the pre-formed elastomeric article. The mold is cooled, in step 188, if needed and the co-molded product 145 is removed from the mold 147 in step 189.

In another configuration, after securing the flocked product 109 in the mold a hot resin is injected into the mold 147 in step 187. The method of molding may be any molding method, such as, but not limited to, injection, reaction injection, compression, transfer, and resin transfer molding. In a particularly preferred embodiment, the method of molding is reaction injection molding, wherein two base resins are mixed together as they enter the mold 147, a chemical reaction occurs within the mold 147 to form the molded article 146. Preferably, the molded article 146 comprises an elastomeric, bendable, and/or stretchable molded article. That is, the molded article 146 substantially has elastic properties (as defined above). In step 188, the mold is cooled and the co-molded product 145 is removed, in step 189, from the mold 147.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. The features of the embodiments of the invention may be combined in alternate embodiments other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations, combinations, and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A flocked product, comprising:
    at least one carrier sheet;
    a plurality of flock fibers having opposing first and second fiber ends; and
    an elastomeric adhesive layer comprising an elastomeric film positioned between opposing first and second adhesive films, wherein the elastomeric adhesive layer has a thickness of from about 100 to about 200 µm, wherein the elastomeric adhesive layer has a modulus from about 10.2 to about 25.4 N for a stretch of 100% of a 25.4 mm wide sample of the elastomeric adhesive layer, wherein the first and second adhesive films are, respectively, substantially continuously distributed over an areal extent of the elastomeric film, wherein the first flock fiber ends are in contact with the first adhesive film, and wherein the at least one carrier sheet is positioned adjacent to one of the second adhesive film or the flock fibers.

2. The flocked product of claim 1, wherein the first and second adhesive films comprise thermoplastic adhesives.

3. The flocked product of claim 1, wherein the first and second adhesive films comprise thermoplastic polyurethanes and wherein the first adhesive film is substantially continuously distributed over areal extent of an interface between the first adhesive film and the flock fibers.

4. The flocked product of claim 2, wherein the first and second adhesive films are substantially free of holes or voids over the areal extent and wherein the elastomeric adhesive layer has one or more of the following properties:
    i) a softening temperature from about 70° to about 85° Celsius;
    ii) a recovery, after being stretched, of at least about 95%; and
    iii) a melt flow index from about 40 dg/min to about 50 dg/min.

5. The flocked product of claim 3, wherein the first and second adhesive films are substantially free of holes or voids over the areal extent and wherein the at least one carrier sheet is positioned adjacent to one of the second adhesive film or the second fiber ends.

6. The flocked product of claim 3, wherein the first flock fiber ends are embedded in the first adhesive film, wherein the at least one carrier sheet is reversibly adhered to the second adhesive film and wherein the elastomeric film comprises an elastomeric polyurethane.

7. The flocked product of claim 5, further comprising a release adhesive, wherein the release adhesive is positioned between the at least one carrier sheet and the plurality of flock fibers and wherein the second fiber ends are in contact with the release adhesive.

8. A flocked article, comprising:
    a substrate;
    a plurality of flock fibers; and
    an elastomeric adhesive layer comprising an elastomeric film positioned between opposing first and second adhesive films, wherein the elastomeric adhesive layer has a thickness of from about 100 to about 200 µm, wherein the elastomeric adhesive layer is positioned between the substrate and the plurality of flock fibers, wherein the plurality of flock fibers are embedded in the first adhesive film and wherein the first and second adhesive films are, respectively, substantially continuously distributed over an areal extent of the elastomeric film.

9. The article of claim 8, wherein the substrate is one or both of a stretchable and/or elastic material.

10. The article of claim 8, wherein the substrate comprises an item of apparel.

11. The article of claim 8, wherein the elastomeric film comprises a polyurethane.

12. The article of claim 8, wherein the first and second adhesive films comprise thermoplastic adhesives.

13. The article of claim 8, wherein the first and second adhesive films comprise thermoplastic polyurethanes.

14. The article of claim 8, wherein the elastomeric adhesive layer has one or more of the following properties:
   i) a softening temperature from about 70° to about 85° Celsius;
   ii) a recovery, after being stretched, of at least about 95%; and
   iii) a melt flow index from about 40 dg/min to about 50 dg/min.

15. The article of claim 8, wherein the second adhesive layer is permanently adhered to the substrate.

16. The article of claim 8, wherein the flock fibers have flock fiber length, and wherein less than about 10% the flock fiber length is embedded in the first adhesive film.

17. The article of claim 8, wherein one or both of the following are true:
   i) the substrate is in the form a background relative to the plurality of flock fibers; and
   ii) the plurality of flock fibers has a void and at least some of the substrate is positioned in the void.

18. The flocked article of claim 8, wherein the elastomeric adhesive layer has a modulus from about 10.2 to about 25.4 N for a stretch of 100% of a 25.4 mm wide sample of the elastomeric adhesive layer.

19. A flocked product, comprising:
   at least one carrier sheet;
   a plurality of flock fibers having opposing first and second fiber ends; and
   an elastomeric adhesive layer comprising an elastomeric film positioned between opposing first and second adhesive films, wherein the elastomeric adhesive layer has a modulus from about 10.2 to about 25.4 N for a stretch of 100% of a 25.4 mm wide sample of the elastomeric adhesive layer, wherein the first and second adhesive films are, respectively, substantially continuously distributed over an areal extent of the elastomeric film, wherein the first fiber ends are in contact with the first adhesive film, and wherein the at least one carrier sheet is positioned adjacent to one of the second adhesive film or the flock fibers.

20. The flocked product of claim 19, wherein the first and second adhesive films comprise thermoplastic adhesives.

21. The flocked product of claim 20, wherein the first and second adhesive films are substantially free of holes or voids over the areal extent and wherein the elastomeric adhesive layer has one or more of the following properties:
   i) a softening temperature from about 70° to about 85° Celsius;
   ii) a recovery, after being stretched, of at least about 95%; and
   iii) a melt flow index from about 40 dg/min to about 50 dg/min.

22. The flocked product of claim 19, wherein the first and second adhesive films comprise thermoplastic polyurethanes and wherein the first adhesive film is substantially continuously distributed over areal extent of an interface between the first adhesive film and flock fibers.

23. The flocked product of claim 22, wherein the elastomeric adhesive layer has a thickness from about 100 to about 200 μm.

24. The flocked product of claim 22, wherein the first and second adhesive films are substantially free of holes or voids over the areal extent and wherein the at least one carrier sheet is positioned adjacent to one of the second adhesive film or the second fiber ends.

25. The flocked product of claim 22, wherein the first flock fiber ends are embedded in the first adhesive film, wherein the at least one carrier sheet is reversibly adhered to the second adhesive film and wherein the elastomeric film comprises an elastomeric polyurethane.

26. The flocked product of claim 25, further comprising a release adhesive, wherein the release adhesive is positioned between the at least one carrier sheet and the plurality of flock fibers and wherein the second fiber ends are in contact with the release adhesive.

27. A flocked product, comprising:
   at least one carrier sheet;
   a plurality of flock fibers having opposing first and second fiber ends; and
   an elastomeric adhesive layer comprising an elastomeric film positioned between opposing first and second adhesive films, wherein the elastomeric adhesive layer has a thickness of from about 100 to about 200 μm, wherein the first and second adhesive films are, respectively, substantially continuously distributed over an areal extent of the elastomeric film, wherein the first flock fiber ends are in contact with the first adhesive film, and wherein the at least one carrier sheet is positioned adjacent to one of the second adhesive film or the flock fibers.

28. The flocked product of claim 27, wherein the first and second adhesive films comprise thermoplastic adhesives.

29. The flocked product of claim 28, wherein the first and second adhesive films are substantially free of holes or voids over the areal extent and wherein the elastomeric adhesive layer has one or more of the following properties:
   i) a softening temperature from about 70° to about 85° Celsius;
   ii) a recovery, after being stretched, of at least about 95%; and
   iii) a melt flow index from about 40 dg/min to about 50 dg/min.

30. The flocked product of claim 27, wherein the first and second adhesive films comprise thermoplastic polyurethanes and wherein the first adhesive film is substantially continuously distributed over areal extent of an interface between the first adhesive film and flock fibers.

31. The flocked product of claim 30, wherein the first and second adhesive films are substantially free of holes or voids over the areal extent and wherein the at least one carrier sheet is positioned adjacent to one of the second adhesive film or the second fiber ends.

32. The flocked product of claim 30, wherein the first flock fiber ends are embedded in the first adhesive film, wherein the at least one carrier sheet is reversibly adhered to the second adhesive film and wherein the elastomeric film comprises an elastomeric polyurethane.

33. The flocked product of claim 32, further comprising a release adhesive, wherein the release adhesive is positioned between the at least one carrier sheet and the plurality of flock fibers and wherein the second fiber ends are in contact with the release adhesive.

34. A flocked article, comprising:
   a substrate;
   a plurality of flock fibers; and
   an elastomeric adhesive layer comprising an elastomeric film positioned between opposing first and second adhesive films, wherein the elastomeric adhesive layer has a modulus from about 10.2 to about 25.4 N for a stretch of 100% of a 25.4 mm wide sample of the elastomeric adhesive layer, wherein the elastomeric adhesive layer is positioned between the substrate and the plurality of flock fibers, wherein the plurality of flock fibers are embedded in the first adhesive film and wherein the first and second adhesive films are, respectively, substantially continuously distributed over an areal extent of the elastomeric film.

35. The article of claim 34, wherein the substrate is one or both of a stretchable and/or elastic material.

36. The article of claim 34, wherein the substrate comprises an item of apparel.

37. The article of claim 34, wherein the elastomeric film comprises a polyurethane.

38. The article of claim 34, wherein the first and second adhesive films comprise thermoplastic adhesives.

39. The article of claim 34, wherein the first and second adhesive films comprise thermoplastic polyurethanes.

40. The article of claim 34, wherein the elastomeric adhesive layer has one or more of the following properties:
   i) a softening temperature from about 70° to about 85° Celsius;
   ii) a recovery, after being stretched, of at least about 95%; and
   iii) a melt flow index from about 40 dg/min to about 50 dg/min.

41. The article of claim 34, wherein the second adhesive layer is permanently adhered to the substrate.

42. The article of claim 34, wherein the flock fibers have flock fiber length, and wherein less than about 10% the flock fiber length is embedded in the first adhesive film.

* * * * *